(12) United States Patent
Theis

(10) Patent No.: US 8,245,502 B2
(45) Date of Patent: Aug. 21, 2012

(54) EMISSION CONTROL SYSTEM WITH AN OPTIMIZED REDUCTANT INJECTION MODEL

(75) Inventor: Joseph Robert Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 571 days.

(21) Appl. No.: 12/485,478

(22) Filed: Jun. 16, 2009

(65) Prior Publication Data

US 2010/0313548 A1    Dec. 16, 2010

(51) Int. Cl.
   *F01N 3/00*    (2006.01)
(52) U.S. Cl. ............... 60/286; 60/274; 60/295; 60/301
(58) Field of Classification Search .............. 60/274, 60/284–287, 295–301
   See application file for complete search history.

(56) References Cited

U.S. PATENT DOCUMENTS

| | | | |
|---|---|---|---|
| 5,490,064 A | 2/1996 | Minowa et al. | |
| 5,842,341 A | 12/1998 | Kibe | |
| 6,119,448 A | 9/2000 | Emmerling et al. | |
| 6,209,313 B1 | 4/2001 | Wissler et al. | |
| 6,415,602 B1 * | 7/2002 | Patchett et al. | 60/286 |
| 6,871,490 B2 | 3/2005 | Liang et al. | |
| 7,469,531 B2 * | 12/2008 | Viola | 60/286 |
| 2003/0216855 A1 | 11/2003 | Liang et al. | |
| 2004/0057888 A1 | 3/2004 | Buzanowski | |
| 2004/0244361 A1* | 12/2004 | Tanabe et al. | 60/274 |
| 2005/0217247 A1* | 10/2005 | Simpson et al. | 60/286 |
| 2005/0260761 A1 | 11/2005 | Lanier et al. | |
| 2006/0042525 A1 | 3/2006 | Lefebvre et al. | |
| 2006/0130458 A1 | 6/2006 | Solbrig | |
| 2006/0248876 A1 | 11/2006 | Taxon | |
| 2007/0193253 A1* | 8/2007 | Tsumagari | 60/286 |
| 2008/0010974 A1 | 1/2008 | Frazier et al. | |
| 2008/0066454 A1* | 3/2008 | Viola | 60/286 |
| 2008/0066455 A1* | 3/2008 | Viola | 60/286 |

OTHER PUBLICATIONS

J. Walker et al., Development of an Ammonia/SCR Nox Reduction System for a Heavy Duty Natural Gas Engine, SAE Technical Paper Series 921673, Sep. 14-17, 1992, pp. 169-181.

* cited by examiner

*Primary Examiner* — Thomas Denion
*Assistant Examiner* — Jesse Bogue
(74) *Attorney, Agent, or Firm* — Damian Porcari; Brooks Kushman P.C.

(57) ABSTRACT

According to at least one aspect of the present invention, there is provided an emission control system which includes a reductant injector injecting a pre-determined amount of a reductant into a vehicle exhaust passage, and sensors measuring an exhaust space velocity, a selective catalytic reduction (SCR) catalyst temperature, and a before-SCR nitrogen oxide ($NO_x$) concentration, wherein the predetermined amount of the reductant is a function of the exhaust space velocity, the before-SCR $NO_x$ concentration, and the SCR catalyst temperature. In at least one particular embodiment, the predetermined amount of the reductant is measured according to equation (I) $y=ax^n$; wherein y is the flow of the reductant; x is the product of the exhaust space velocity and the before-SCR $NO_x$ concentration; and "a" and "n" are each independently a function of the catalytic temperature ("T") of the selective catalytic reduction catalyst.

18 Claims, 12 Drawing Sheets

| | CRITERIA | | |
|---|---|---|---|
| | MAX $NO_x$ CONVERSION | MIN ($NO_x+NH_3$) | MIN ($NO_x+NH_3$) +(0-50ppm) |
| $NO_x$ CONVERSION (%) | ■ | ▲ | ● |
| $NH_3$ SLIP (ppm) | □ | △ | ○ |

EMISSION CONTROL SYSTEM WITH AN OPTIMIZED REDUCTANT INJECTION MODEL

BACKGROUND OF THE INVENTION

1. Field of the Invention

Embodiments of the present invention relate to an emission control system for reducing nitrogen oxide emissions from the exhaust of an internal combustion engine.

2. Background Art

The exhaust from a combustion engine exhaust often contains a variety of waste components including unburned hydrocarbon (HC), carbon monoxide (CO), particulate matter (PM), nitric oxide (NO), and nitrogen dioxide ($NO_2$), with the NO and $NO_2$ collectively referred to as the oxides of nitrogen or $NO_x$.

Selective Catalytic Reduction (SCR) with ammonia ($NH_3$) can be used for $NO_x$ control on lean-burn gasoline engines and diesel engines. A reductant such as ammonia ($NH_3$) is often supplied from an external source, and the SCR catalyst uses base metals to promote the reaction between the $NH_3$ and the $NO_x$ in the exhaust to produce $N_2$ and $H_2O$ under lean conditions. In certain other instances, a liquid solution of urea [$CO(NH_2)_2$] can be injected instead of $NH_3$ for vehicle applications. When injected into an exhaust, the urea breaks down into molecules of $NH_3$.

An important feature of SCR catalysts is that the SCR catalysts can store $NH_3$ in the washcoat at temperatures below 400° C. This stored $NH_3$ can be particularly useful during transient driving conditions, where the exhaust flow rate and/or the $NO_x$ concentration can change rapidly. If the injected flux of $NH_3$ is less than the instantaneous $NO_x$ flux, the stored $NH_3$ may be used to supplement the injected $NH_3$. Conversely, if the injected flux of the $NH_3$ is more than the instantaneous $NO_x$ flux, the excess $NH_3$ can be stored on the SCR catalyst.

However, at temperatures above 400° C., the $NH_3$ storage capacity of the SCR catalyst decreases substantially. At these higher temperatures, the $NH_3$ has to be carefully injected to match or closely correspond to the $NO_x$ flux in order to maximize the $NO_x$ conversion and minimize the $NH_3$ slip. This can be a significant challenge during transient driving conditions. If too little $NH_3$ is injected, the $NO_x$ conversion will be decreased, and if too much $NH_3$ is injected, the $NH_3$ slip will increase uncontrollably.

Moreover, certain SCR catalysts may oxidize excess $NH_3$ to NOx at certain higher temperatures which results in additional $NO_x$ emission.

As such, it would be desirable to provide an emission control system wherein the supply of SCR reductant such as $NH_3$ is effectively controlled for an improved $NO_x$ reduction and/or optimized reduction in the $NH_3$ slip.

SUMMARY OF THE INVENTION

According to at least one embodiment of the present invention, an emission control system is provided for reducing nitrogen oxide ($NO_x$) emissions from the exhaust of an internal combustion engine. In at least one embodiment, the emission control system includes a reductant injector injecting a pre-determined amount of a reductant into a vehicle exhaust passage, and sensors measuring an exhaust space velocity, and a selective catalytic reduction (SCR) catalyst temperature, and a before-SCR nitrogen oxide ($NO_x$) concentration, wherein the predetermined amount of the reductant is a function of the exhaust space velocity, the before-SCR $NO_x$ concentration, and the SCR catalyst temperature. In at least another embodiment, the sensors are provided within a control module for receiving vehicle operating parameters and for controlling the predetermined amount of the reductant to be injected through the reductant injector.

In at least yet another embodiment, the sensors include a first sensor for receiving at least one of the vehicle operating parameters and measuring the before-SCR $NO_x$ concentration, a second sensor for receiving at least one of the operating parameters and measuring the exhaust space velocity, and a third sensor for receiving at least one of the operating parameters and measuring the SCR catalyst temperature.

In at least one particular embodiment, the predetermined amount of the reductant is calculated according to an equation (I) $y = ax^n$, wherein y is the predetermined amount of the reductant, x is the product of the exhaust space velocity and the before-SCR $NO_x$ concentration, and "a" and "n" are each independently a function of the catalytic temperature of the SCR catalyst, wherein the catalytic temperature is measured in degrees Celsius, and the before-SCR $NO_x$ concentration is measured in parts-per-million (ppm); and the exhaust space velocity is measured in inverse hours ($hr^{-1}$).

According to at least another aspect of the present invention, a method is provided for reducing nitrogen oxide ($NO_x$) from the exhaust transported within an exhaust passage having a SCR catalyst disposed therein. In at least one embodiment, the method includes measuring an exhaust space velocity, a before-SCR $NO_x$ concentration, and a catalytic temperature of the SCR catalyst, and injecting a predetermined amount of a reductant to the vehicle exhaust passage, wherein the predetermined amount of the reductant is a function of the exhaust space velocity, the before-SCR $NO_x$ concentration, and the SCR catalyst temperature.

DETAILED DESCRIPTION OF EMBODIMENTS OF THE INVENTION

Figure 1A:
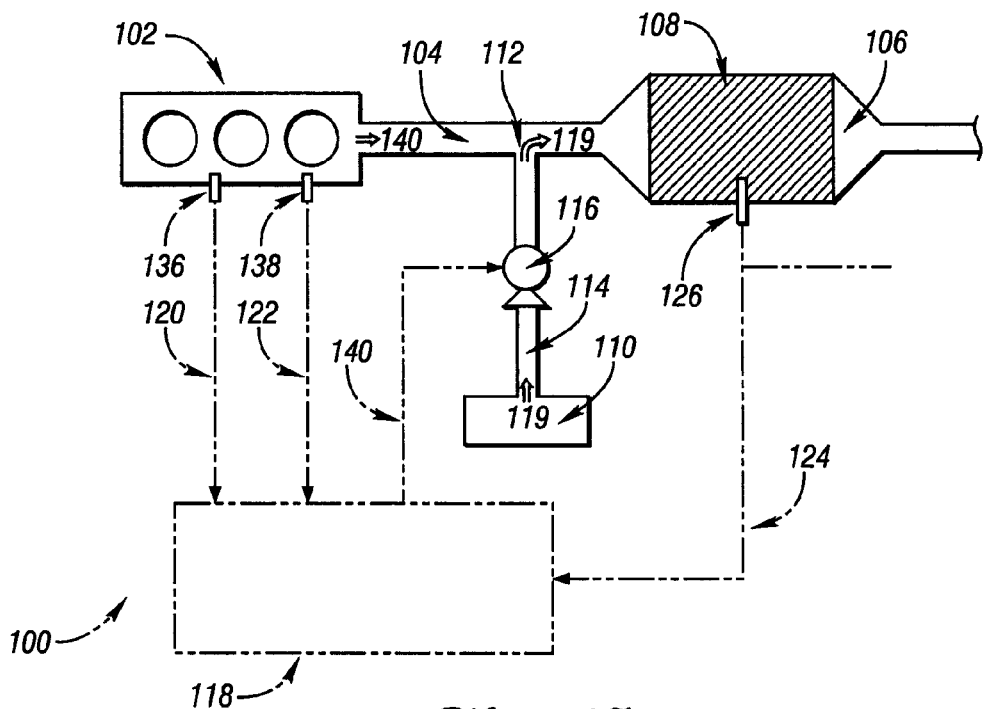
FIG. 1A depicts an emission control system for reducing nitrogen oxide emissions from the exhaust of an internal combustion engine according to at least one embodiment of the present invention.

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

As a matter of definition, and when used in this detailed description and in the claims:

"SCR" means selective catalytic reduction and includes a reducing catalyst which speeds or enhances a chemical reduction of $NO_x$ by a chemical reagent during lean operation.

"$NO_x$" means nitrogen oxide and illustratively including a mixture of compounds of nitric oxide (NO) and nitrogen dioxide ($NO_2$).

A "before-SCR $NO_x$ concentration" means the concentration in parts-per-million (ppm) of $NO_x$ emitting from an engine, transported within an exhaust passage, and before being catalytically converted by a SCR catalyst.

An "after-SCR $NO_x$ concentration" means the concentration in ppm of $NO_x$ in an exhaust emitting out of a SCR catalyst.

A "reductant" is externally supplied to the exhaust passage from a source other than the products of combustion produced in the combustion process of the engine. The external reductant may be a nitrogen-based reagent such as ammonia metered in gaseous form or an aqueous solution of urea metered in liquid form to the reducing catalyst.

"Space velocity" is the volumetric flow rate of the exhaust gas at standard conditions (one atmosphere and 20° C.) divided by the volume of the SCR catalyst, i.e., volume of gas in $m^3/hr$ versus volume of catalyst in $m^3$, which produces units of $hr^{-1}$ for space velocity.

"Storage capacity" is the ability of a reducing catalyst to adsorb or store a reductant in the washcoat at a given temperature.

"Steady state" means stable operation and occurs when the engine operating parameters or the engine "system" does not significantly change over a discrete time period.

It has further been found that $NO_x$ emissions may be effectively reduced by adjusting the input of an externally applied reductant into an engine exhaust passage, whereas the adjustment of reductant flow is realized through a mathematical coupling among three measurable parameters, namely an exhaust space velocity, a before-SCR $NO_x$ concentration, and a catalytic temperature of the SCR catalyst. The mathematical coupling follows an equation of $y=ax^n$ wherein y represents a predetermined amount of the reductant; x is the product of the exhaust space velocity and the before-SCR $NO_x$ concentration; and the parameters "a" and "n" are each independently a function of the catalytic temperature of the SCR catalyst.

This mathematical coupling is advantageous for reducing nitrogen oxide ($NO_x$) for an internal combustion engine, especially when the engine is running at an exhaust temperature at or above certain temperatures, such as 400° C., when the reductant storage capacity of the SCR catalyst may have been exhausted. Under those operating conditions, the present discovery of the mathematical coupling enables a real-time determination as to the amount of reductant that needs to be injected into the exhaust passage, and to be introduced onto the SCR catalyst, in response to a variation in the before-SCR $NO_x$ concentration, temperature, or space velocity such that a sum total of both the after-SCR $NO_x$ emission and the ammonia ($NH_3$) slip is effectively minimized.

According to at least one aspect of the present invention, an emission control system is provided for reducing nitrogen oxide ($NO_x$) from the exhaust of an internal combustion engine. In at least one embodiment, and as illustrated in FIG. 1A, the emission control system is generally shown at 100. An exhaust 140 produced from an internal combustion engine 102, gets transported through an exhaust passage 104 to a SCR catalyst 108 disposed within a catalyst housing section 106 of the exhaust passage 104. A reductant 119 is disposed within the exhaust passage 104 downstream of the engine 102. The emission control system 100 further includes a control module 118 for receiving one or more operating parameters (not shown) of the engine 102 and the SCR catalyst 108 and controlling a predetermined amount of the reductant 119 to be injected into the exhaust passage 104 such that an after-SCR $NO_x$ concentration is reduced and/or a sum total of the after-SCR $NO_x$ emission and an ammonia slip is effectively minimized.

The reductant 119 may be introduced from a reductant storage source 110 through a pipe 114 and gets injected into the exhaust passage 104 via an inlet 112 disposed upstream of the SCR catalyst 108. A reductant injector 116 is coupled to the pipe 114 such that the reluctant injection is either manually controllable or automatically programmable.

In at least another embodiment, and as depicted in FIG. 1A, the control module 118 may include a first sensor 136 upstream of the SCR catalyst 108 for receiving at least one of the operating parameters and for measuring the before-SCR $NO_x$ concentration; a second sensor 138 upstream of the SCR catalyst 108 for receiving at least one of the operating parameters and measuring an exhaust space velocity of the SCR catalyst 108; and a third sensor 126 downstream of the engine 102 for receiving at least one of the operating parameters and measuring a catalytic temperature of the SCR catalyst 108.

While upstream of the SCR catalyst 108, the first sensor 136 may be located anywhere within the exhaust passage 104 or within the engine 102 as long as the before-NOx concentration may be measured. It is also possible that the first sensor 136 is not physically located within but merely in electrical communication with the exhaust passage 104 or the engine 102 for the purpose of measuring the before-SCR NOx concentration.

Likewise, while upstream of the SCR catalyst 108, the second sensor 138 may be located anywhere within the exhaust passage 104 or within the engine 102 as long as the exhaust space velocity may be measured. It is also possible that the second sensor 138 is not physically located within but merely in electrical communication with the exhaust passage 104 or the engine 102 for the purpose of measuring the exhaust space velocity.

In measuring the before-SCR NOx concentration, both the first sensor 136 and the second sensor 138 may each be a sensor assembly having various sub-sensors (not shown) each collecting one or more operating parameters.

The operating parameters may include a speed/load signal, a fuel demand signal, an air intake temperature signal, an air intake humidity signal, a mass air flow signal, a exhaust $NO_x$ concentration signal, and an exhaust temperature signal. Additionally, the exhaust gas temperature may be modeled from other sensors such as ambient temperature, coolant temperature, and fuel signals. See the U.S. Pat. No. 5,490,064 to Minowa et al., the entire content of which is incorporated herein by reference.

In at least one particular embodiment, in measuring the before-SCR NOx concentration, the first sensor 136 receives one or more signals from an engine speed sub-sensor (not shown) and an engine torque sub-sensor (not shown) from at any given time and accesses a map stored in a look up table in the control module 118, to predict for that time the actual $NO_x$ emissions emitted by the engine 102. An exemplary reference illustratively showing several torque/speed maps is SAE Paper 921673, the entire content of which is incorporated herein by reference.

Figure 1B:
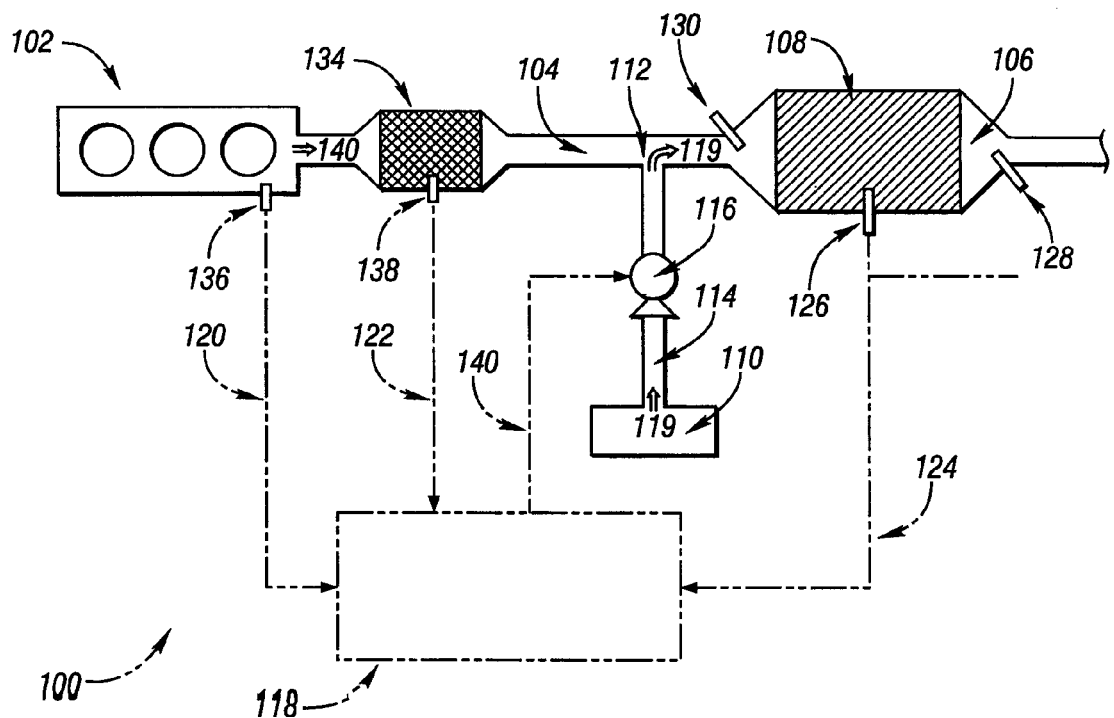
FIG. 1B depicts an alternative emission control system in relation to FIG. 1A according to at least another embodiment of the present invention.

The catalyst temperature of the SCR catalyst 108 may be measured through the third sensor 126 that may be located, as depicted in FIG. 1A, substantially midway of the SCR catalyst 108. Optionally, and as depicted in FIG. 1B, the third sensor 126 may further incorporate temperature readings from an auxiliary temperature sensor 130 located immediately upstream of the SCR catalyst 108 and/or an auxiliary temperature sensor 128 located immediately downstream of the SCR catalyst 108. The auxiliary temperature sensors 130 and 128 are used when a temperature reading taken at the midway of the SCR catalyst 108 is no longer a sufficient representation of the catalyst temperature throughout the SCR catalyst 108 in the direction of the flow of the exhaust 140.

In at least one embodiment, and as depicted in FIG. 1A, the first sensor 136 is in electrical communication with the control module 118 through a wiring 120. In at least another embodiment, and as depicted in FIG. 1A, the second sensor 138 is in electrical communication with the control module 118 through a wiring 122. In at least yet another embodiment, and as depicted in FIG. 1A, the third sensor 126 is in electrical communication with the control module 118 through a wiring 124. The length of each of the wiring 120, 122, or 124 is not particularly critical in carrying out the present invention as long as relevant readings from each of the sensors 136, 138, and 126 are received within the control module 118. It is possible that one or more of the wirings 120, 122, and 124 may be absent such that the corresponding sensor having an absent wiring is therefore directly attached to the control module 118.

Upon receiving the value of the before-SCR NOx concentration measured by the first sensor 136, the value of the exhaust space velocity measured by the second sensor 138, and the value of the catalytic temperature of the SCR catalyst 108 measured by the third sensor 126, the control module 118 thereafter controls a predetermined amount of the reductant 119 to be injected into the exhaust passage 104 through the reductant inlet 112 such that an after-SCR $NO_x$ concentration is reduced and/or a sum total of the after-SCR $NO_x$ emission and an ammonia slip is effectively minimized. Upon deciding the predetermined amount of the reductant 119 to be injected, the controlled module 118 sends a control signal via wiring 140 to the reductant injector 116, which commands the release of the reductant 119 to be released into the exhaust passage 104.

Alternatively and as depicted in FIG. 1B a three-way catalyst and/or an oxidation catalyst 134 may be disposed within the exhaust passage 104 downstream of the engine 102 and upstream of the inlet 112. In this variation, the first sensor 136 and/or the second sensor 138 may receive operative parameters further including parameters in relations to the oxidative catalyst 134. Such operating parameters in relation to the oxidative catalyst 34 illustratively include a catalytic temperature of the oxidation catalyst 130 and a catalytic conversion rate of the oxidation catalyst 130.

In at least one embodiment, the predetermined amount of the reductant is determined according to the equation (I)

$$y = ax^n, \text{ wherein}$$

y is the predetermined amount of the reductant;

x is the product of the exhaust space velocity and the before-SCR $NO_x$ concentration; and the parameters "a" and "n" are each independently a function of the catalytic temperature of the SCR catalyst.

The mathematical coupling between the predetermined amount of the reductant 119 and the operating parameters such as the exhaust space velocity, the before-SCR $NO_x$ concentration, and the catalytic temperature of the SCR catalyst, as governed by the equation (I) $y=ax^n$, is applicable to a wide variety of operating ranges directed to each of the parameters.

An operable range of the exhaust space velocity applicable to the equation (I) may be independently selected from no less than 5 K/hr, 15 K/hr, 35 K/hr, or 45 K/hr, to no greater than 200K, 150K, 125K, 115 K/hr, 105 K/hr, 95 K/hr, 85 K/hr, 75 K/hr, or 65 K/hr.

An operable range of the exhaust $NO_x$ concentration may be independently selected from no less than 50 ppm, 150 ppm, 250 ppm, 350 ppm, 450 ppm, or 550 ppm, to no greater than 2000 ppm, 1800 ppm, 1600 ppm, 1400 ppm, 1200 ppm, 1000 ppm, or 800 ppm.

An operable range of the catalyst temperature (T) of the SCR catalyst may be independently selected from no less than 150° C., 250° C., or 350° C., to no greater than 950° C., 850° C., 750° C., 650° C., or 550° C.

Figure 5:
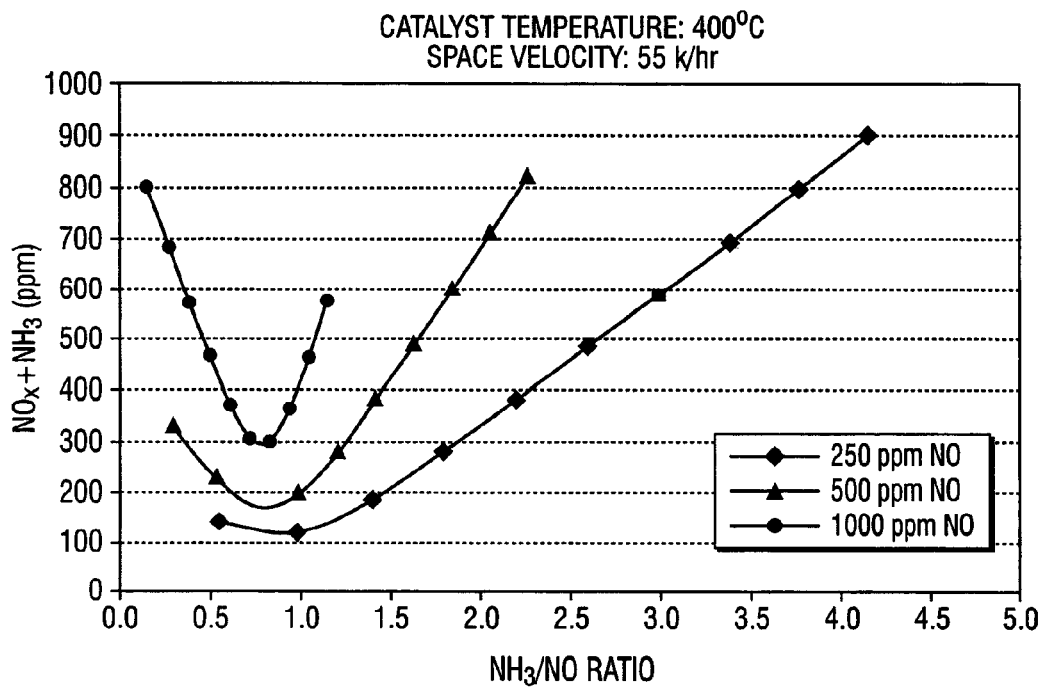
FIG. 5 depicts the sum of the $NO_x$ emission and $NH_3$ emission (y-axis) at 400° C. and 55,000 $hr^{-1}$ as a function of the $NH_3$/NO ratio (x-axis) for the exhaust-like feed NO concentrations of 250, 500, and 1000 ppm; the $NH_3$ concentration is varied from 143 to 1085 ppm.

As stated above, the reductant storage capacity of the SCR catalyst is often exhausted at or above certain temperatures such as a temperature of 400° C. As such, ammonia slip is rather a significant source of tailpipe emission when the reductant used is a nitrogen-based reductant such as ammonia and/or liquid or solid urea. The present invention also advantageously aims at minimizing the sum total of both the after-SCR $NO_x$ concentration and the ammonia concentration that forms the tailpipe ammonia slip as one integrated emission factor to be targeted for control.

an integrated emission factor ("IEF") representing the sum emission of the after-SCR $NO_x$ concentration and the ammonia slip (sum emission of "$NO_x+NH_3$"), as particularly illustrated in FIG. 5, is found to be a function of the ratio of $NH_3/NO$ in the exhaust after being subjected to the SCR catalytic reaction.

Figure 6:
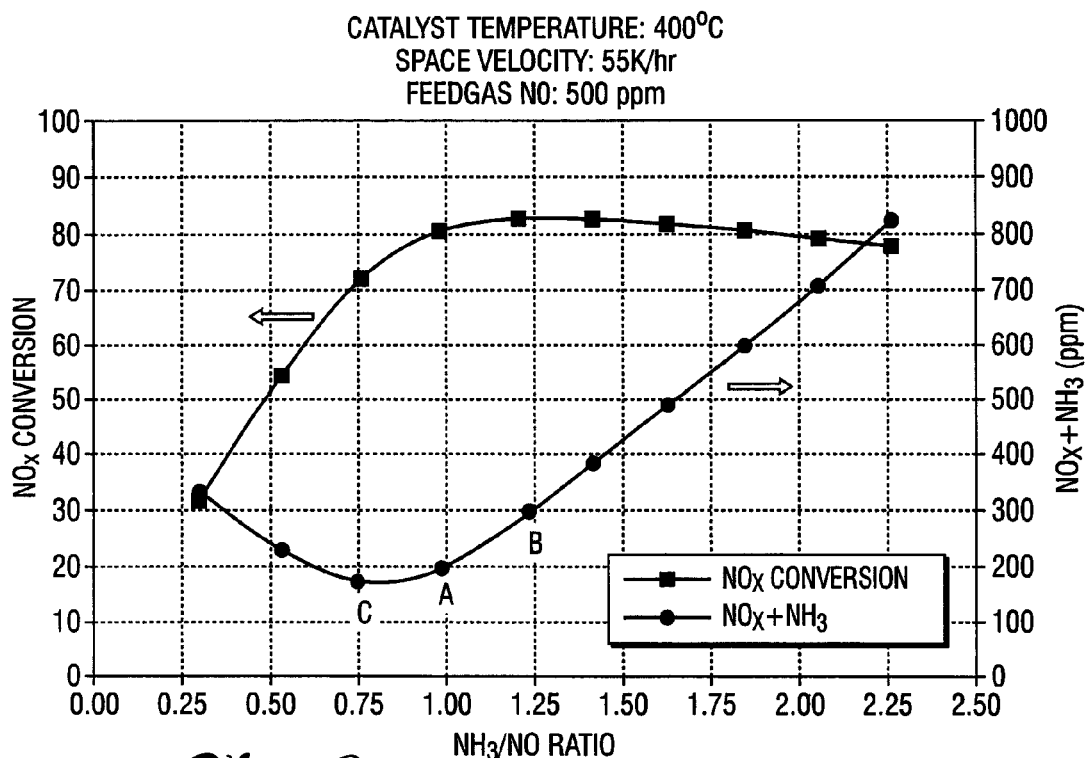
FIG. 6 depicts the $NO_x$ conversion percentage (left y-axis) and the sum emission of "$NO_x+NH_3$" (right y-axis) at 400° C. and 55,000 $hr^{-1}$ as a function of the $NH_3/NO$ ratio with 500 ppm NO; the $NH_3$ concentration is varied from 143 to 1085 ppm.

It has further been discovered, and as illustrated in FIG. 6, that the $NO_x$ conversion may be increased significantly when the sum emission "$NOx+NH_3$" is allotted a permissible amount above an IEF minimum.

In at least one particular embodiment of the present invention, the range for the permissible amount may be zero or may be independently selected from no less than 5 ppm, 15 ppm, 25 ppm, 30 ppm, 35 ppm, 40 ppm, or 45 ppm, to no greater than 100 ppm, 90 ppm, 80 ppm, 70 ppm, or 60 ppm.

Figure 8:
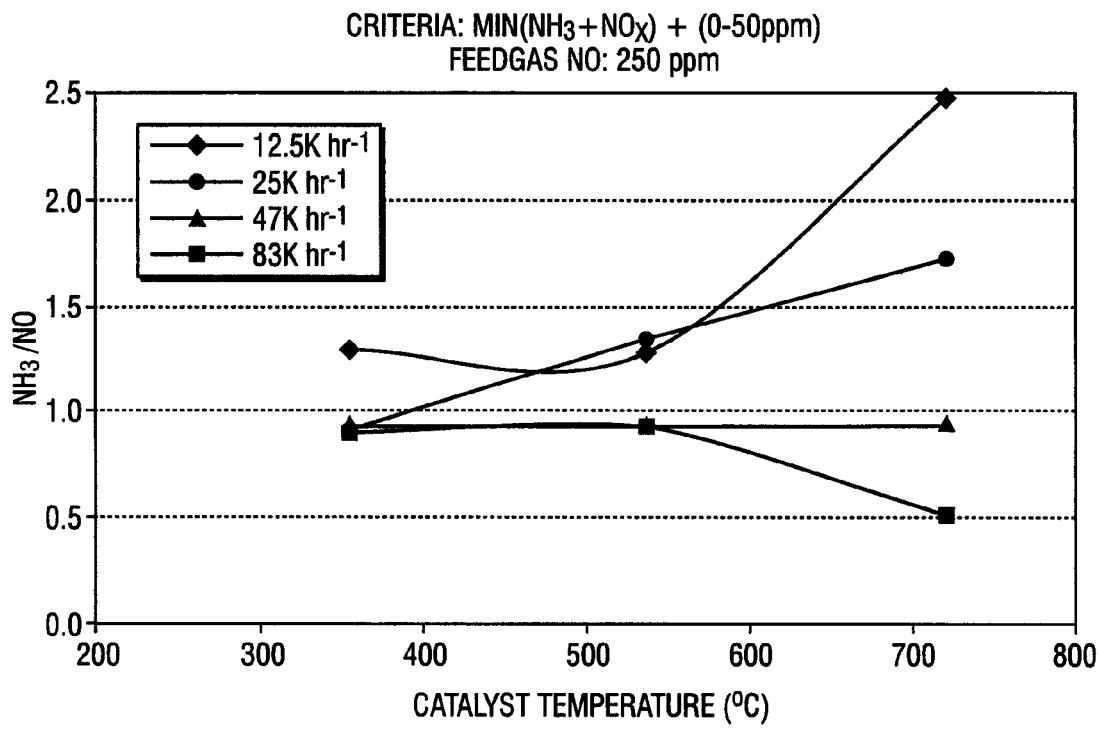
FIG. 8 depicts various $NH_3/NO$ ratios, where the sum of the $NO_x$ and $NH_3$ emissions is up to 50 ppm above the minimum sum emission as a function of the catalyst temperature when tested with 250 ppm exhaust NO at space velocities ranging from 12.5K to 83K $hr^{-1}$.
Figure 9:
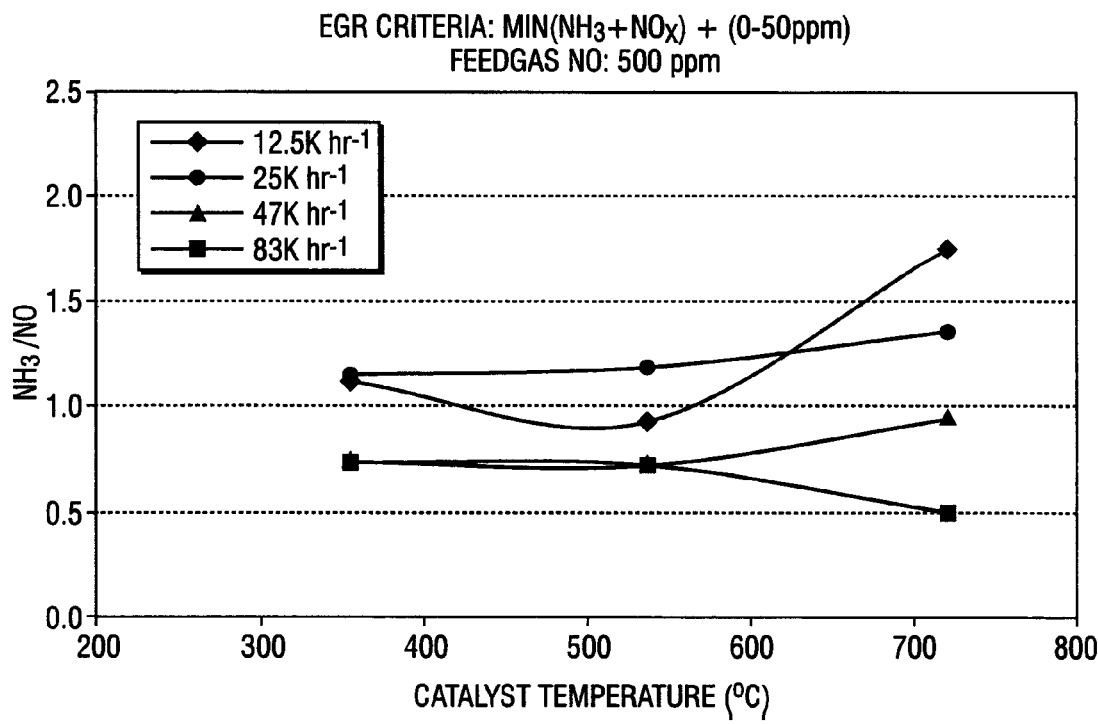
FIGS. 9 and 10 depict similar changes observed in FIG. 8 with the exception that the exhaust NO concentrations are 500 ppm and 1000 ppm, respectively.
Figure 10:
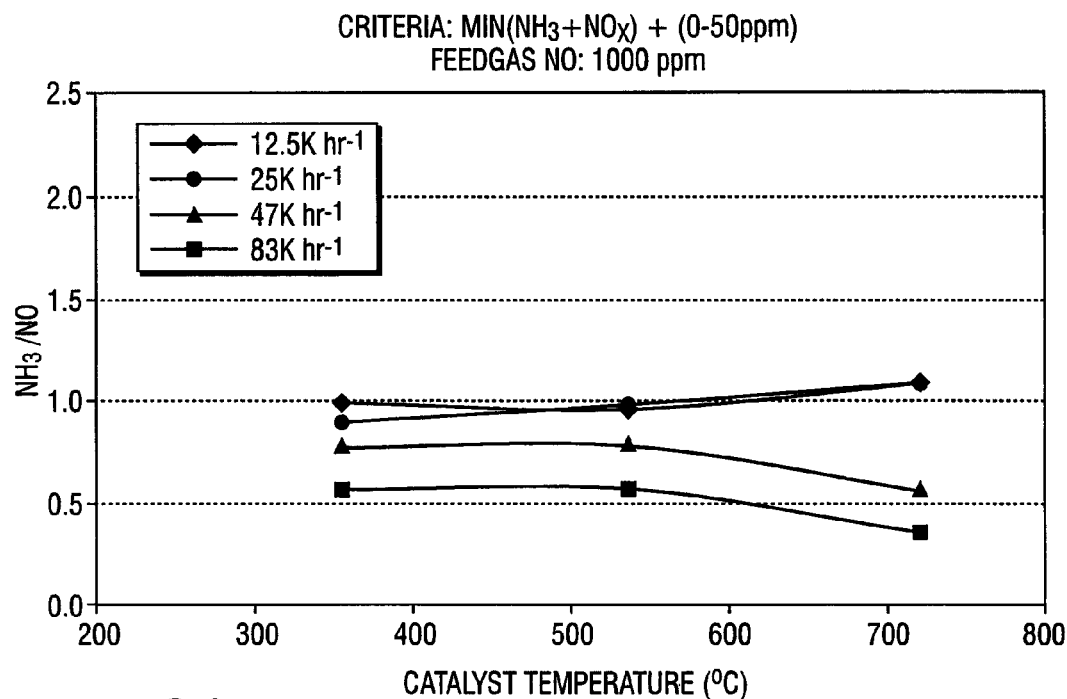

When the sum emission "$NO_x+NH_3$" is maintained at a value of the IEF minimum plus the allotted permissible amount, the optimal $NH_3/NO_x$ ratio is found, as illustrated in FIGS. 8, 9, and 10 for NO concentrations of 250, 500, and 1000 ppm, respectively, to be a function of the catalyst temperature as well as the exhaust space velocity.

An optimum $NH_3/NO$ ratio becomes more sensitive to the value of a space velocity at higher temperatures and generally, lower space velocity values allow for higher optimum $NH_3/NO$ ratios. However, the benefit of a lower space velocity to tolerate higher $NH_3$ supply is tapered as the exhaust $NO_x$ concentration increases. As such, when the exhaust $NO_x$ concentration is at a certain higher range, such as a range of 750 ppm to 1500 ppm, the optimal $NH_3/NO_x$ is rather narrowly defined in order to satisfy the emission criteria that the sum emission is no greater than the IEF minimum plus the permissible amount.

Based on these discoveries, it has also been found that the optimal $NH_3/NO_x$ ratio may be determined as a simple function of catalyst temperature (T) and a single variable X which represents the product of the exhaust space velocity (SV) and the before-SCR $NO_x$ concentration; and the parameters "a" and "n" are each independently a function of the catalytic temperature ("T") of the SCR catalyst.

As used herein and unless otherwise indicated, the term "effectively minimized" refers to situations wherein the $NH_x/NO$ ratio is at an optimized ratio that produces the minimum sum of the after-SCR $NO_x$ and $NH_3$ emissions. By way of example, when the injected $NH_3$ concentration is 10 percent of the exhaust $NO_x$ concentration (i.e., $NH_3/NO$ ratio of 0.1), and after the $NO_x$ conversion is complete, the after-SCR $NO_x$ concentration may be 90% (percent) of the exhaust $NO_x$ concentration and the after-SCR $NH_3$ concentration is essentially zero. The resulting sum of the after-SCR $NH_3$ and $NO_x$ concentrations may be 90% of the exhaust $NO_x$ concentration. When the injected $NH_3$ concentration is 300 percent of the exhaust $NO_x$ concentration (i.e., $NH_3/NO$ ratio of 3.0), and when the NOx conversion is of a rate of at least 40 percent, the after-SCR $NO_x$ concentration may be no more than 60%, 50%, 40%, 30%, 20%, 10%, or 0% of the exhaust $NO_x$ concentration (with the actual percentage depending on the space velocity, the exhaust $NO_x$ concentration, and temperature), while the corresponding after-SCR $NH_3$ concentration becomes no more than 260%, 250%, 240%, 230%, 220%, 210%, or 200% of the exhaust $NO_x$ concentration. It is appreciated that the actual $NH_3$ concentration may be lower than the levels identified immediately above if reactions other than the $NO_x$ conversion may consume some of the $NH_3$. These reactions may include the oxidation of the $NH_3$ with $O_2$. The resultant sum of the after-SCR $NH_3$ and $NO_x$ concentrations may be no more than 320%, 300%, 280%, 260%, 240%, 220%, or 200% of the exhaust $NO_x$ concentration. Between these two extreme $NH_3/NO$ ratios of 0.1 and 3.0, there is a $NH_3/NO$ ratio where the sum of the after-SCR $NO_x$ and $NH_3$ concentration is at a minimum; this optimized ratio and the corresponding sum of the after-SCR $NO_x$ and $NH_3$ concentrations will depend on the space velocity, the temperature, and the exhaust $NO_x$ concentration but will be at least 40%, 50%, 60%, 70%, 80%, 90%, or 100% less than the exhaust $NO_x$ concentration.

In at least one embodiment, "a" is further determined by the equation (II)

$$\text{``}a\text{''} = p(T/100)^2 - q(T/100) + w$$

wherein p, q, and w are each a constant and may be any numerical value, wherein the catalytic temperature is measured in degrees Celsius; the before-SCR $NO_x$ concentration is measured in parts-per-million (ppm); and the exhaust space velocity is measured in inverse hours ($hr^{-1}$).

In at least one particular embodiment, the constant "p" is in a range independently selected from no less than 0.01, 0.03, 0.05, or 0.07 to no greater than 0.90, 0.70, 0.50, 0.30, or 0.10. In at least one particular embodiment, the value of "p" is 0.0595 when the temperature is in degrees Celcius.

In at least another particular embodiment, the constant "q" is in a range independently selected from no less than 0.1, 0.2, 0.3, 0.4, or 0.5 to no greater than 1.0, 0.9, 0.8, 0.7, or 0.6. In at least one particular embodiment, the value of "q" is 0.53 when the temperature is in degrees Celcius.

In at least yet another particular embodiment, the constant "w" is in a range independently selected from no less than 0.4, 0.6, 0.8, 1.0, 1.2, 1.4, 1.6, or 1.8 to no greater than 6.0, 5.5, 5.0, 4.5, 4.0, 3.5, 3.0, or 2.5. In at least one particular embodiment, the value of "w" is 2.07 when the temperature is in degrees Celcius.

In at least another embodiment, the exponential factor "n" is further determined by an equation (III): $n=-k(T/100)^2+s(T/100)-u$; wherein "k", "s", and "u" are each independently a constant and may be of any value.

In at least one particular embodiment, the constant "k" is in a range independently selected from no less than 0.005, 0.01, 0.03, or 0.05, to no greater than 0.95, 0.75, 0.55, 0.35, 0.15, or 0.09. In at least one particular embodiment, the value of "k" is 0.065 when the temperature is in degrees Celcius.

In at least another particular embodiment, the constant "s" is in a range independently selected from no less than 0.10, 0.20, 0.30, 0.40, or 0.50, to no greater than 2.0, 1.6, 1.2, or 0.8. In at least one particular embodiment, the value of "s" is 0.579 when the temperature is in degrees Celcius.

In at least yet another particular embodiment, the constant "u" is in a range independently selected from no less than 0.4, 0.6, 0.8, or 1.2, to no greater than 2.4, 2.1, 1.8, or 1.5. In at least one particular embodiment, the value of "u" is 1.39 when the temperature is in degrees Celcius.

The constants "P", "q", "w", "K", "s", and "u" are each ascertainable and hence a known value in relation to a particular engine exhaust system. For example, when the permissible amount of "$NO_x+NH_3$" is predetermined and the exhaust system coupling with the engine is established, the constants are reasonably ascertained.

In a particular embodiment, the $NH_3/NO_x$ ratio is determined by the equation of $[0.060(T/100)^2-0.53(T/100)+2.07]*[NO*SV/10^7]^{[-0.065(T/100)^2+0.58(T/100)-1.39]}$ when the temperature is in degrees Celcius.

In another particular embodiment, the $NH_3/NO_x$ ratio is determined by the equation of $[0.024(T/100)^2-0.22(T/100)+1.29]*[NO*SV/10^7]^{[-0.057(T/100)^2+0.50(T/100)-1.30]}$ when the temperature is in degrees Celcius.

The SCR catalyst 108 may generally comprise a zeolite or a mixture of titanium, vanadium, tungsten and/or molybdenum oxides and one or more reducing catalysts may be used or different catalyst bed formulations used in one reducing catalyst. Reference may be made to Byrne U.S. Pat. No. 4,961,917 incorporated herein by reference for a description of a suitable reducing catalyst.

The reductant 119 may be nitrogen-based illustratively including ammonia urea, and cyanuric acid; and other reactants including hydrocarbon. In the case where urea is used, the urea may be in the form of liquid urea or solid urea pellets; whereas the cyanuric acid is used, the cyanuric acid gets converted to isocyanic acid (HNCO).

In addition to urea and cyanuric acid other nitrogen based reductants include ammelide, ammeline, ammonium cyanate, biuret, isocyanic acid, melamine, tricyanourea, and mixtures of any number of these. However, the invention in a broader sense is not limited to nitrogen based reductants, but can include any reductant containing HC such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

The reductant may be supplied in a conventional manner. The supply of the reductant is controlled by a microprocessor commanded through the control module 118. The reductant is metered based at least partly on an actual $NO_x$ emission emitted by the engine, which may be predicted by conventional technology using steady state $NO_x$ maps of selected engine operating parameters. Alternately, the exhaust NO concentration can be measured with a $NO_x$ sensor.

According to at least another aspect of the present invention, a method is provided for reducing nitrogen oxide (NOx) of a vehicle exhaust passage having a selective catalytic reduction (SCR) catalyst disposed therein, the method comprising: measuring a $NO_x$ concentration upstream of the selective catalytic reduction catalyst; measuring an exhaust space velocity of the selective catalytic reduction catalyst; measuring a catalyst temperature of the selective catalytic reduction catalyst; and injecting a predetermined amount of the reductant to the vehicle exhaust passage, wherein the predetermined amount of the reductant is a function of the exhaust space velocity, the before-SCR $NO_x$ concentration, and the catalytic temperature. In at least one embodiment, the predetermined amount of the reductant 119 is calculated according to equation (I) $y=ax^n$, with "a", "n", and "x" defined as above.

In at least another embodiment, the method is employed during a lean operation. Lean operation may be defined in terms of a lambda value which is a ratio between an actual air/fuel ratio and a stoichiometric air/fuel ratio within an exhaust passage. A lean operation occurs when the lambda value is greater than 1.0. Under the lean operation conditions, an exhaust contains an excess amount of oxidants including oxygen and NOx, wherein a combined concentration of the oxidants is greater than the combined concentration of reductants including hydrogen, carbon monoxide, and hydrocarbons.

One or more embodiments of the present invention are further illustrated by the following non-limiting examples.

EXAMPLES

Example 1

Figure 2:
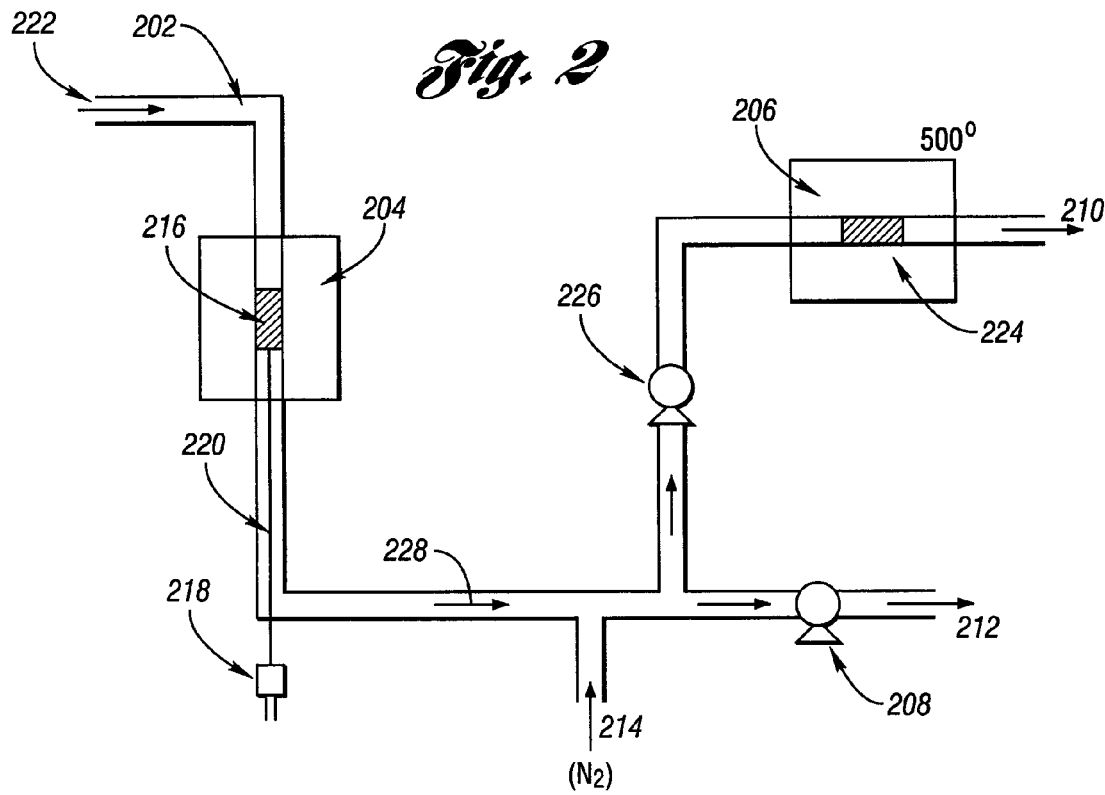
FIG. 2 depicts an experimental workflow in relation to the experimental examples disclosed herein.

Experimental procedures for FIGS. 3-23 are generally given as below. As illustratively shown in FIG. 2, an exhaust-like feed 222 contains 250, 500, or 1000 ppm of NO, variable $NH_3$ in an amount ranging from 100-1200 ppm, 10% $H_2O$ (water), 10% $CO_2$ (carbon dioxide), 5% $O_2$ (oxygen), and balance $N_2$ (nitrogen). The exhaust enters passage 202 at a flow rate of 2.5 L/min (liters per minute). The exhaust-like feed 222 consequently enters reactor 204 which encloses a portion of the passage 202 within which a Fe(iron)-based SCR catalyst bed 216 is disposed. A thermocouple 218 is remotely connected to the SCR catalyst bed 216 via a wire 220 to measure a catalytic temperature (T) of the SCR catalyst 216. After reacting with the SCR catalyst 216, the treated exhaust 228 exits the reactor 204 and gets combined with an added $N_2$ at a flow rate of 22.5 L/min at 214. A volume ratio between the added $N_2$ and the exhaust is about 10:1. The added $N_2$ dilutes the treated exhaust 228 and reduces $H_2O$ condensation in the passage 202.

A pump 208 is used to pump a portion of the treated exhaust 228 after combination with the added $N_2$ to an analyzer bench as a test gas 212 to be analyzed for concentration readings for various parameters including hydrocarbon ("HC"), $O_2$, $H_2O$, $CO_2$, and $NO_x$.

Another portion of the treated exhaust 228 after combination with the added $N_2$ is pumped at 226 and enters reactor 206 to be oxidized by a platinum-containing oxidation catalyst 224 at 500° C. which oxidizes any $NH_3$ to NO.

Upon oxidation within the reactor 206, most if not all of the $NH_3$ slip portion of the treated exhaust 228 is now converted to NO. This exhaust stream 210 gets analyzed for NO content using a second NO analyzer. The difference between the NO reading at 210 and the $NO_x$ reading at 212 is indicative of the extent of $NH_3$ slip. Since the NO and $NO_x$ readings are measured for the diluted exhaust, the experimental $NH_3$ slip is multiplied by the dilution ratio of 10 to determine the actual $NH_3$ slip exiting the reactor 204.

$NO_x$ conversion of the exhaust-like feed 222 is determined from the NO content of the exhaust-like feed 222 before entering the reactor 204 and the measured amount of $NO_x$ in the gas portion 212. The NO concentration in the exhaust can be measured by bypassing the reactor 204 though a bypass line (not shown) and diluting the exhaust with the $N_2$ at 214. Both the exhaust NO concentration and the $NO_x$ concentration exiting the reactor 204 can be determined by multiplying the diluted concentrations measured at 212 by the dilution ratio of 10.

As applicable to the various examples set forth below, the Fe-based SCR catalyst 216 has been aged with full time lean operation at 800° C. for 34 hours.

Figure 3:
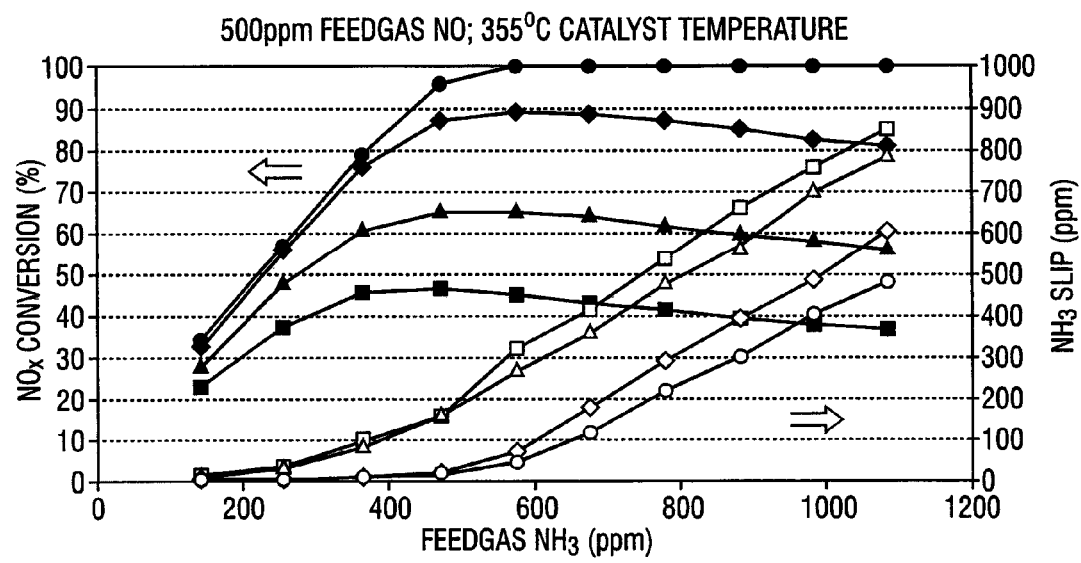
FIG. 3 depicts $NO_x$ conversion (left y-axis) and $NH_3$ slip (right y-axis) as a function of $NH_3$ concentration (x-axis) in an exhaust-like feed with the experimental conditions given as below: steady-state $NO_x$ conversion and $NH_3$ slip are analyzed for different lengths of a Fe-based SCR catalyst aged with full-time lean operation at 800° C. for tests performed at 83K, 55K, and 25K $hr^{-1}$ or for a Fe-based SCR catalyst aged with full-time lean operation at 800° C. followed by another Fe-based SCR catalyst aged primarily at stoichiometry at 750° C. for test performed at 12.5K $hr^{-1}$; the catalyst bed temperature is 355° C.; NO concentration is 500 ppm, and $NH_3$ is varied from 143 ppm to 1085 ppm; and the exhaust also includes 5% $O_2$, 10% $H_2O$, 10% $CO_2$, balance $N_2$.

FIG. 3 depicts the $NO_x$ conversion (left y-axis) and the $NH_3$ slip (right y-axis) as a function of the exhaust $NH_3$ concentration (x-axis) for tests performed at various space velocities as indicated. The exhaust of Example 1 includes 500 ppm NO, and a catalyst bed temperature is at 355° C. As shown in FIG. 3, for any given $NH_3$ concentration, the $NO_x$ conversion decreases and the $NH_3$ slip increases as the space velocity increases (i.e., SCR volume decreases). With exhaust $NH_3$ supplied at or greater than 500 ppm, a noticeable decrease in the $NO_x$ conversion appears among test groups at space velocities 83K, 47K, and 25K $hr^{-1}$. The test group performed at the space velocity of 12.5K $hr^{-1}$ remains at a steady $NO_x$ conversion regardless of the excessive $NH_3$ concentrations in the exhaust.

Example 2

Experimental procedures remain the same as illustrated in Example 1 above with the exception that the temperature of catalyst bed is at an elevated level of 535° C.

Figure 4:
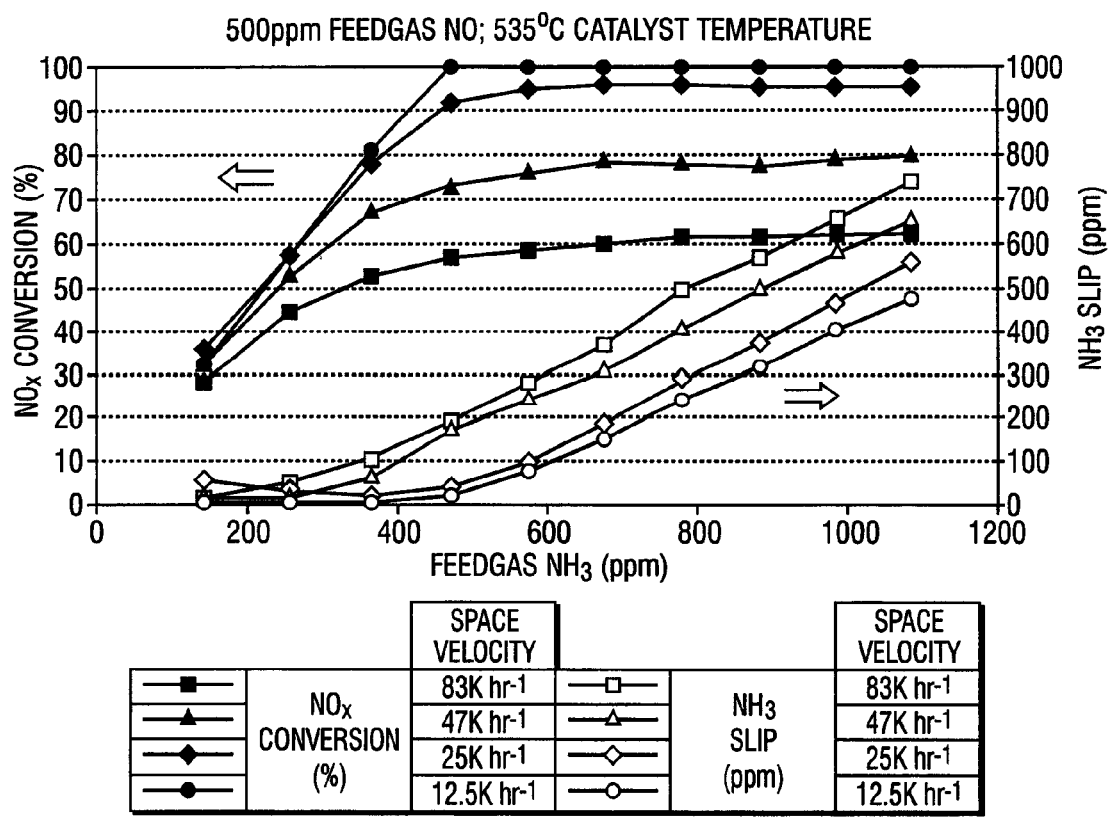
FIG. 4 depicts $NO_x$ conversion (left y-axis) and $NH_3$ slip (right y-axis) as a function of $NH_3$ concentration in the exhaust-like feed with the same experimental conditions as given in FIG. 3 above except that the catalyst bed temperature is 535° C. instead.

Noticeably different from the results of FIG. 3, the $NO_x$ conversion rates of FIG. 4 do not show declining trends when the exhaust $NH_3$ concentration is in excess over the exhaust NO concentration. It is indicative that a higher catalyst temperature helps to reduce the inhibition from excess $NH_3$ that was observed at 355° C. in Example 3.

Example 3

The experiment is carried out in the same conditions set forth in Example 1 above with the exception that the temperature of the catalyst bed is 400° C. and the space velocity is 55K $hr^{-1}$.

FIG. 5 depicts the sum of the $NO_x$ emissions and the $NH_3$ slip (y-axis) as a function of the $NH_3$/NO ratio (x-axis) in the exhaust for exhaust NO concentrations of 250, 500, and 1000 ppm.

The sum emissions of "$NO_x+NH_3$" are minimized when the $NH_3$/NO ratio was between 0.5-1.0. Also, as expected, the sum emissions of "$NO_x+NH_3$" increase as the initial NO contents in the exhaust are elevated.

The test performed with 500 ppm NO in the exhaust of FIG. 5 is again presented in FIG. 6, which shows the $NO_x$ conversion (left y-axis) and the sum emission of "$NO_x+NH_3$" (right y-axis) as a function of the $NH_3$/NO ratio. When the $NH_3$/NO ratio is increased from 0.76 to 0.98, the $NO_x$ conversion increases 8% from 72% to 80%, while the sum emission of "$NO_x+NH_3$" only increases by a nominal amount of 26 ppm (i.e., from 172 to 198 ppm). This observation is indicative that, at least in some instances, a break point exists where a significant increase in $NO_x$ conversion may be realized at the cost of a nominal increase above the minimum of the sum emission of "$NO_x+NH_3$".

Example 4

Figure 7:
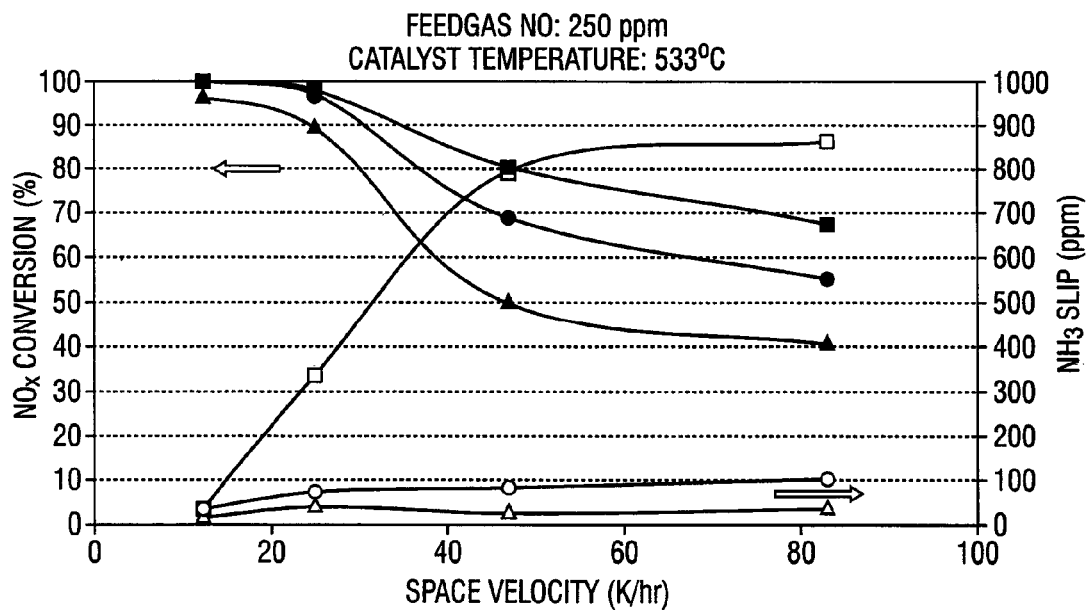
FIG. 7 depicts the $NO_x$ conversion percentage (left y-axis) and the $NH_3$ slip (right y-axis) with 250 ppm NO at 533° C. as a function of various space velocities ranging from 12.5 to 83K $hr^{-1}$ for 3 different methods of optimizing the $NH_3/NO$ ratio: (1) maximum $NO_x$ conversion; (2) minimum $NO_x+NH_3$ emissions; and (3) $NO_x+NH_3$<minimum+50 ppm.

Experimental procedures remain the same as illustrated in Example 1 above with the exception that the tests are performed with a exhaust having 250 ppm NO and the catalyst temperature is 533° C. FIG. 7 depicts the $NO_x$ conversion percentage (left y-axis) and the $NH_3$ slip (right y-axis) as a function of various space velocities ranging from 12.5 to 83K $hr^{-1}$.

The lines with square-shaped data points are determined with $NH_3$/NO ratios that maximize the $NO_x$ conversion (such as point B in FIG. 6). The lines with triangle-shaped data points are determined using $NH_3$/NO ratios that minimize the sum emissions of $NO_x$ and $NH_3$ such as point C in FIG. 6). The lines with circle-shaped data points are determined using $NH_3$/NO ratios that allow the sum emission of "$NO_x+NH_3$" to exceed the minimum "$NO_x+NH_3$" by up to 50 ppm (such as point A in FIG. 6).

As shown in FIG. 7, large amounts of $NH_3$ slip are observed at high space velocity values when the $NH_3$/NO ratio is optimized for maximum $NO_x$ conversion. The $NH_3$ slip is dramatically reduced using the other 2 criteria for the $NH_3$/NO ratio as illustrated by the circle-shaped and the triangle-shaped data lines. At a space velocity of 47K $hr^{-1}$, using the $NH_3$/NO ratio corresponding to the minimum sum emission of "$NO_x+NH_3$" plus 50 ppm elicits an increase in $NO_x$ conversion from 50% to 70% as compared to the test having $NH_3$/NO ratio corresponding to a minimum sum emission of "$NO_x+NH_3$". In contrast to selecting the $NH_3$/NO ratio that produces the maximum $NO_x$ conversion of approximately 80%, using the $NH_3$/NO ratio corresponding to the minimum sum emission of "$NO_x+NH_3$" plus 50 ppm demonstrates a drastic reduction in $NH_3$ slip while keeping the $NO_x$ conversion at a reasonable value of 70%.

Example 5

Experimental procedures remain the same as illustrated in Example 1 above with the exception that NO in the exhaust is provided at 250 ppm, 500 ppm, and 1000 ppm corresponding to FIGS. 8-10, respectively.

FIG. 8 depicts various $NH_3$/NO ratios, when the sum emission is up to 50 ppm above the minimum sum emission as a function of the catalyst temperature for a exhaust NO level of 250 ppm. At low space velocity values, SCR catalysts with higher catalyst temperatures seem to better tolerate the impact of higher $NH_3$/NO ratios as compared to catalysts at lower operating temperatures. This is possibly because at least a portion of the excess $NH_3$ in the exhaust is converted to $N_2$ by the catalyst at certain higher temperatures so as to result in less $NH_3$ slip and hence a better tolerance to higher $NH_3$/NO ratios.

Similar changes are observed with test results depicted in FIGS. 9 and 10 corresponding to 500 ppm and 1000 ppm exhaust NO, respectively. As the initial NO concentration of the exhaust increases from 500 ppm to 1000 ppm, the $NH_3$/NO ratios at each space velocity behave more similarly over the course of temperature changes and particularly the tolerance for high NH₃/NO ratios observed at high temperatures with 12.5K hr⁻¹ space velocity and with lower NO values of 250 ppm and 500 ppm is obviously much lower for the test with 1000 ppm NO.

Example 6

Figure 11:
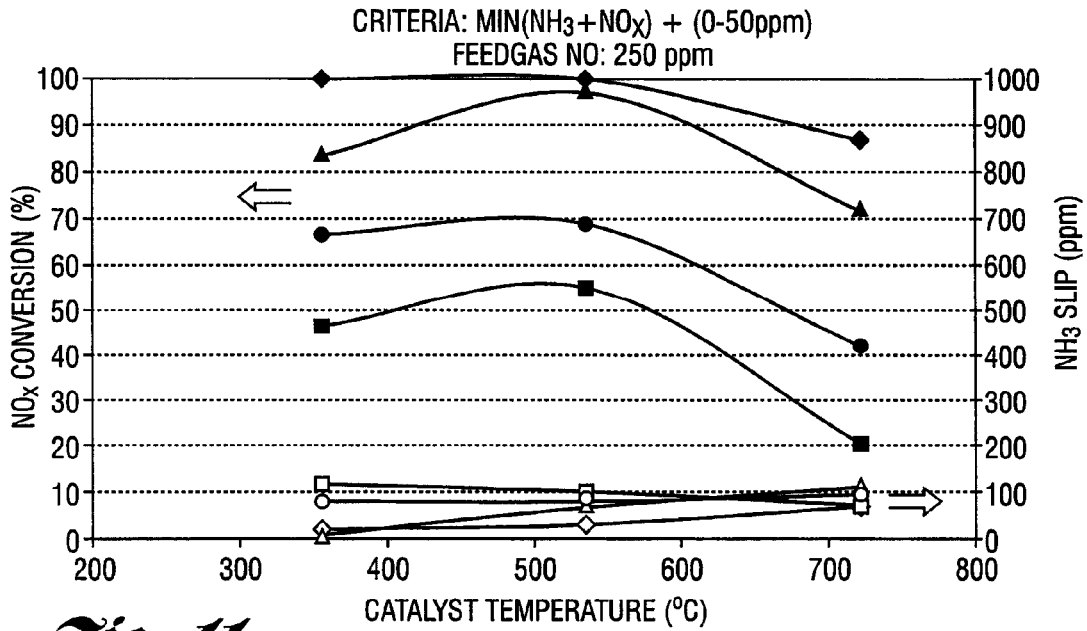
FIGS. 11, 12 and 13 depict $NO_x$ conversion rates (left y-axis) and $NH_3$ slip amounts in ppm (right y-axis) as a function of catalyst temperature when tested with 250, 500, and 1000 ppm NO, respectively, and at space velocities ranging from 12.5K to 83K $hr^{-1}$.
Figure 12:
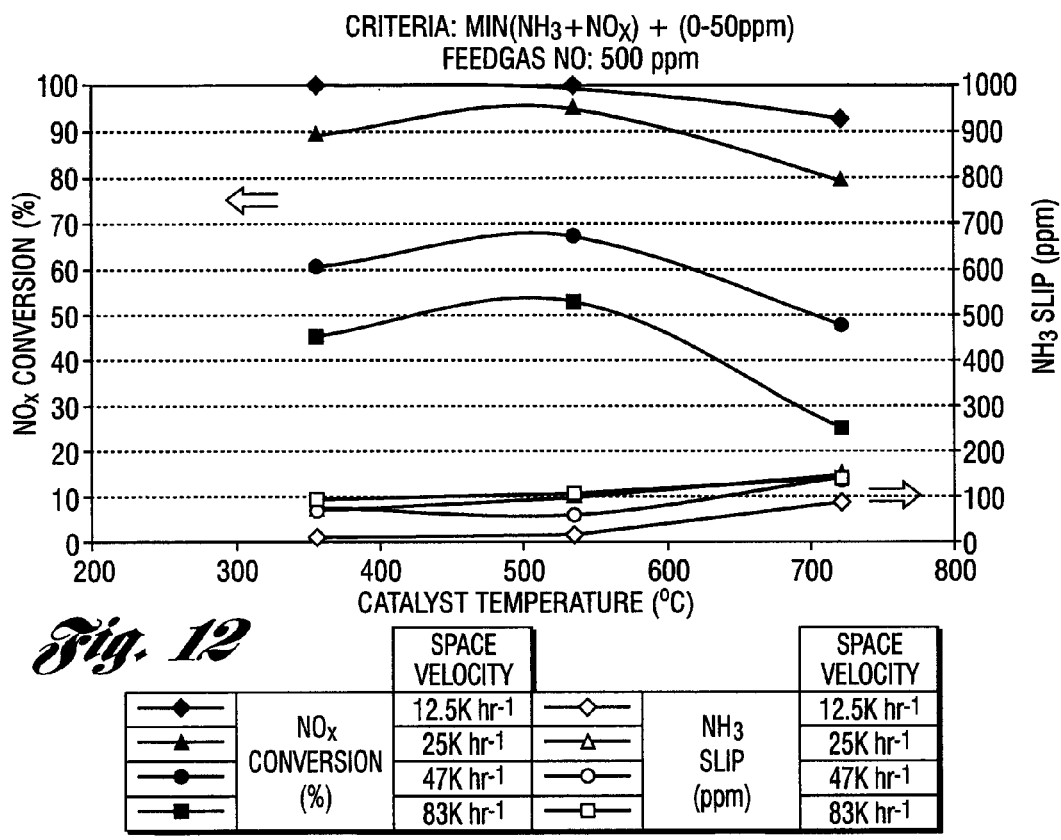
Figure 13:
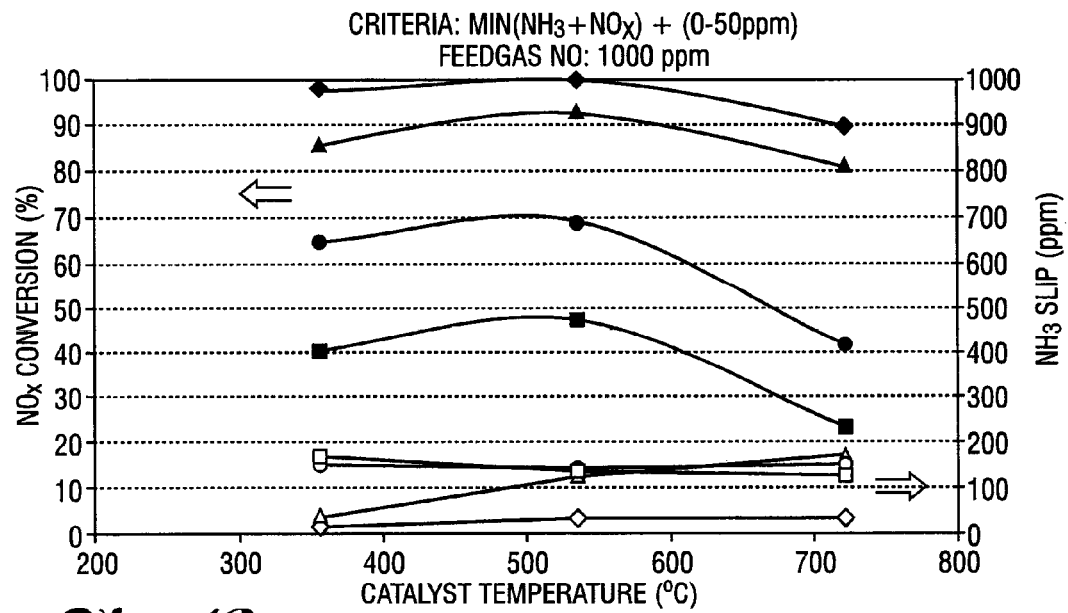

FIGS. 11-13 show the $NO_x$ conversions corresponding to the NH₃/NO ratios shown in FIGS. 8-10.

FIGS. 11-13 depict $NO_x$ conversion rates (left y-axis) and NH₃ slip amounts in ppm (right y-axis) as a function of catalyst temperatures with exhaust levels of NO corresponding to 250 ppm, 500 ppm, and 1000 ppm, respectively.

For all the tests performed with the four space velocities, NH₃ slip is below a manageable amount of 200 ppm. This is at least partly due to the fact that the NH₃/NO ratios are chosen such that the sum emission is no greater than the minimum sum emission plus 50 ppm.

Moreover, all tests demonstrated that as the space velocity decreased, the $NO_x$ conversion increased.

Example 7

To model the optimized NH₃/NO values from FIGS. 8-10, the space velocity and NO concentration are combined into a single variable (SV*NO), hereafter referred to as the "$NO_x$ flux". The optimized NH₃/NO ratios corresponding to the minimum sum emission of "$NO_x$+NH₃" plus 50 ppm are plotted as a function of this $NO_x$ flux for all three temperatures according to FIG. 14. At both 355° C. and 535° C., the optimized NH₃/NO ratios decrease almost linearly as the $NO_x$ flux increases. Also, for a given $NO_x$ flux, the optimized ratios are essentially the same at these two temperatures. In contrast, the optimum ratios at 720° C. decrease exponentially from a value near 2.5 at the lowest $NO_x$ flux to a value near 0.4 at the highest $NO_x$ flux.

Figure 15:
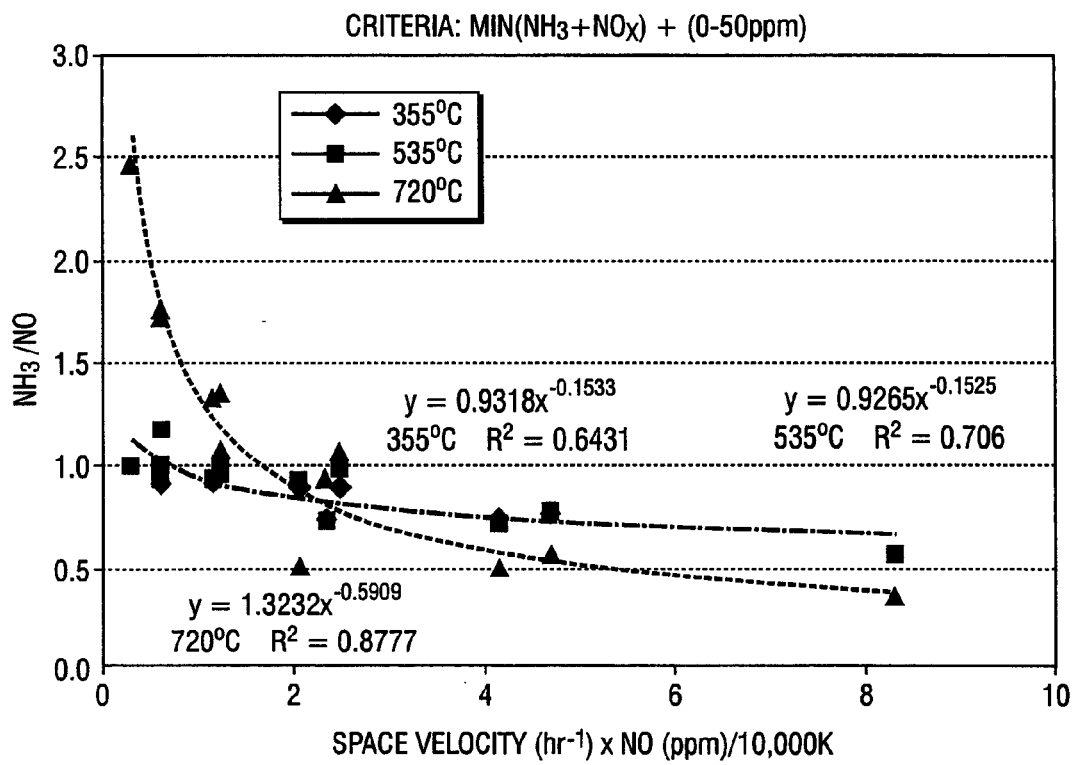
FIG. 15 depicts a comparison between the experimentally-determined ratios from FIG. 14 with the results of the least-squares fits using a power-law relationship $Y=aX^n$.

The data for each temperature are fit to a power-law relationship $Y=aX^n$, where the parameters "a" and "n" are each a function of the catalyst temperature. FIG. 15 compares the experimentally-determined ratios with the results of the least-squares fits. Values for "a" and "n" are similar at 355° C. and 535° C. However, the absolute magnitude of "n" is much larger at 720° C. relative to the absolute magnitude of "n" at 355° C. and 535° C., reflecting the greater sensitivity of the optimized NH₃/NO ratio to the $NO_x$ flux at this higher temperature.

At a catalyst temperature of 355° C., the power-law relationship is modeled as $y=0.9318\,X^{-0.1533}$; at catalyst temperature of 535° C., the power-law relationship is modeled as $y=0.9265\,X^{-0.1525}$; at a catalyst temperature of 720° C., the power-law relationship changes quite dramatically to be modeled as $y=1.3232\,X^{-0.5909}$.

Example 8

Figure 14:
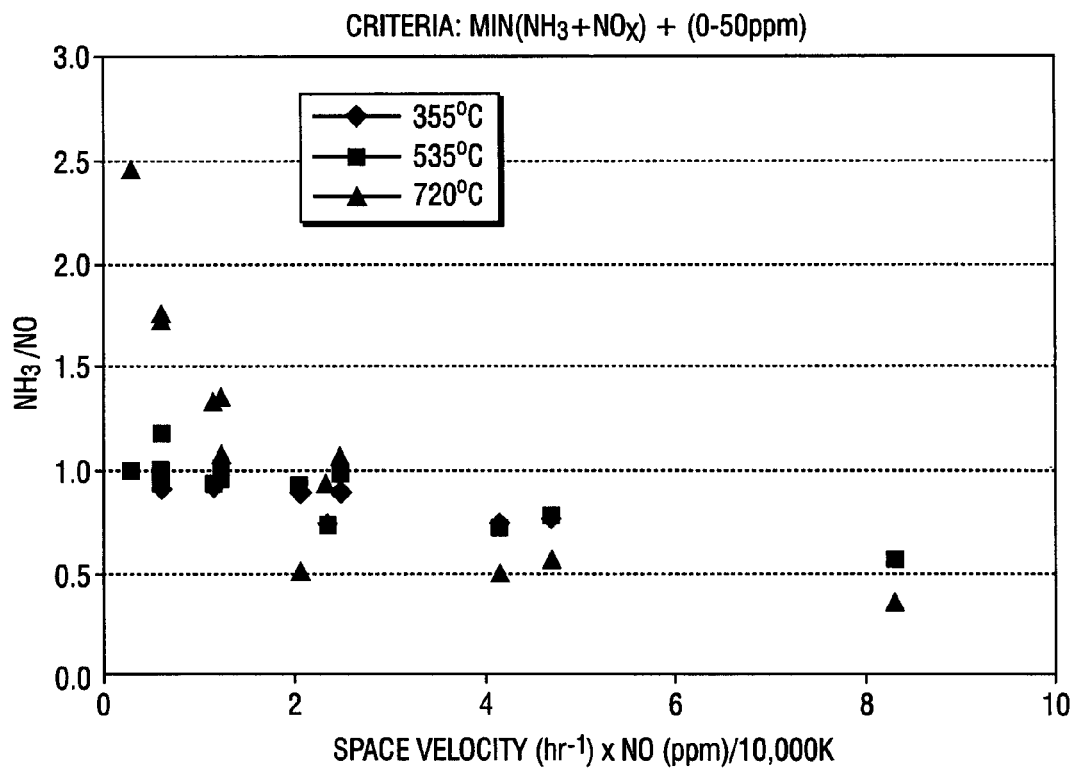
FIG. 14 depicts the optimized $NH_3/NO$ ratios plotted as a function of the product of the space velocity and the exhaust NO concentration for temperatures of 355° C., 535° C., and 720° C., where the sum of the $NO_x$ and $NH_3$ emissions is up to 50 ppm above the minimum $NO_x+NH_3$ emission.

As demonstrated in FIGS. 14-15 above, the parameters "a" and "n" are each a function of and hence sensitive to catalyst temperatures.

Figure 16:
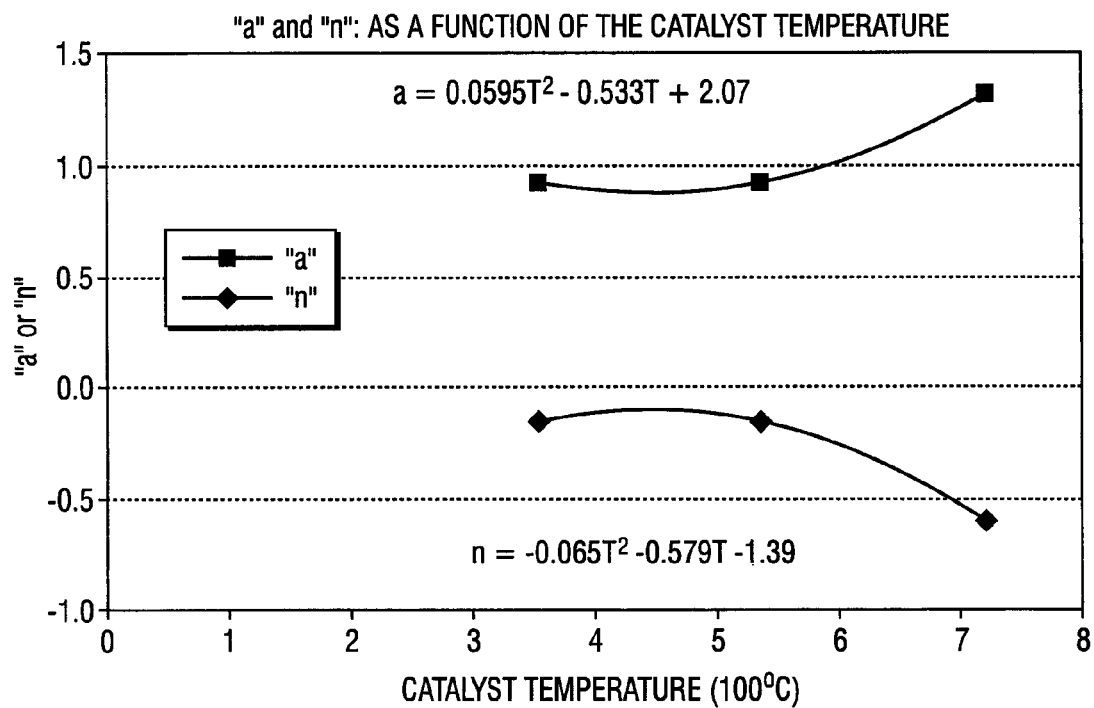
FIG. 16 depicts values for "a" and "n" from the least-squares fits each plotted as a function of the catalyst temperature (divided by 100), where the sum of the $NO_x$ and $NH_3$ emissions is up to 50 ppm above the minimum sum emission.

The value of "a" and the value of "n" are each plotted as a function of the catalyst temperature (divided by 100) in FIG. 16.

The value of "a" is modeled as "a"=$[0.06(T/100)^2-0.53(T/100)+2.07]$; and the value of "n" is modeled as "n"=$[-0.065(T/100)^2+0.58(T/100)-1.39]$ when the temperature is in degrees Celsius.

As such, an optimum NH₃/NO ratio corresponding to a sum emission of "$NO_x$+NH₃" of no greater than minimum emission plus 50 ppm is determined by the equation $$y=ax^n$$

wherein "a" and "n" are defined as above, x is the single variable $NO_x$ flux expressed as the product of space velocity and the exhaust NO content, wherein the catalyst temperature "T" is measured in degrees Celsius "C", the NO concentration is in ppm, and the space velocity is in hr⁻¹.

Example 9

Figure 17:
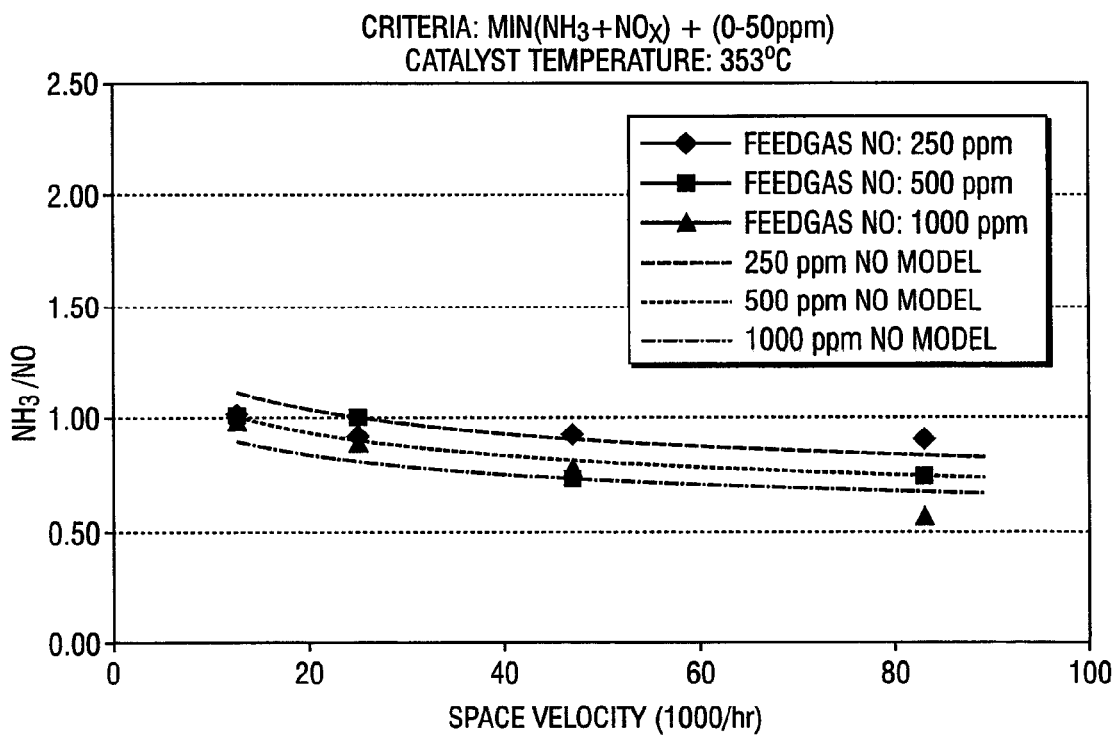
FIGS. 17, 18, and 19 depict the model evaluated with 250 ppm NO, 500 ppm $NO_x$, or 1000 ppm $NO_x$ that fits well with the actual experimental data for space velocities ranging from 12.5 to 83K $hr^{-1}$ and for SCR catalyst temperatures of 353, 535, and 720° C., respectively, where the sum of the $NO_x$ and $NH_3$ emissions is up to 50 ppm above the minimum sum emission.
Figure 18:
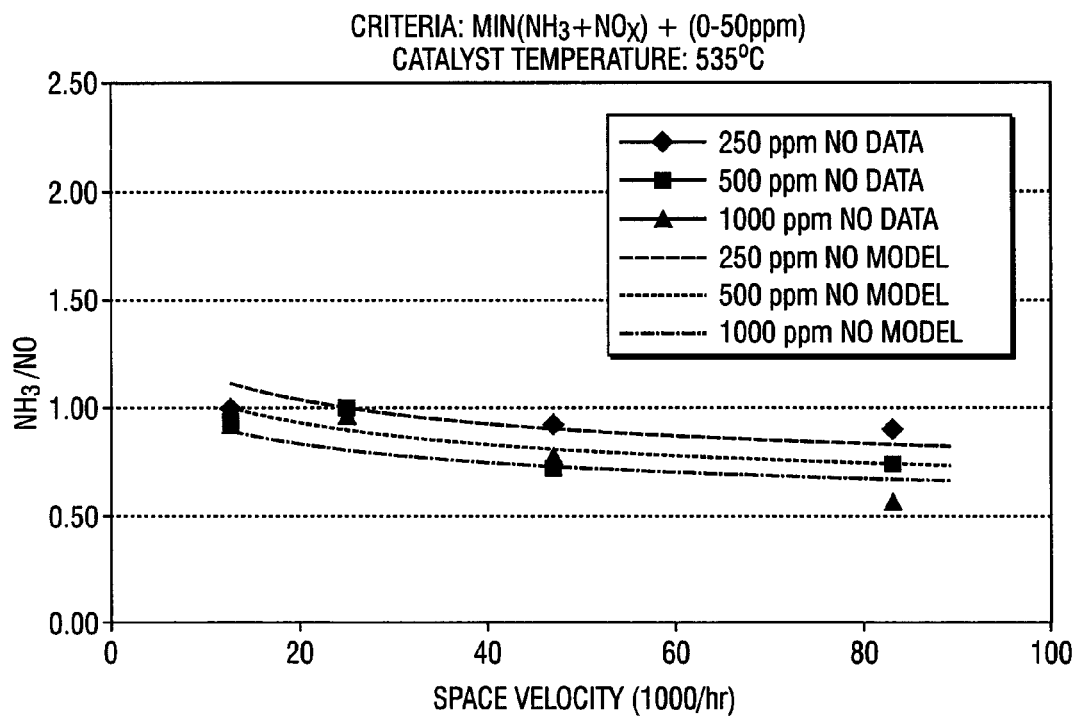
Figure 19:
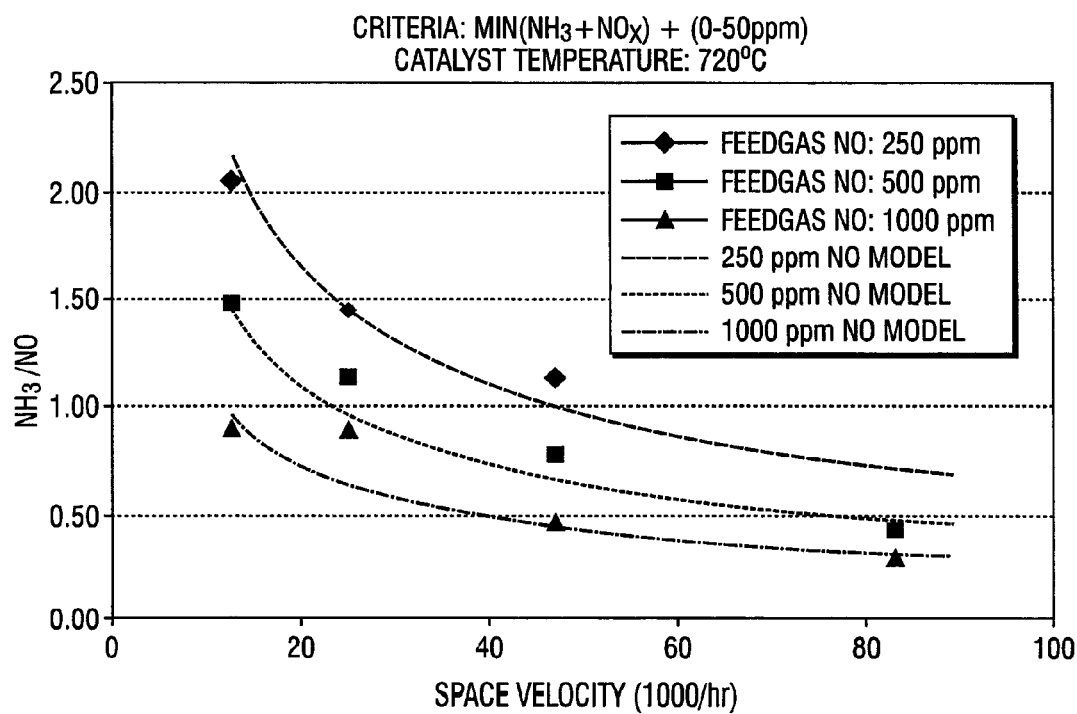

Results of FIG. 14 are reproduced in FIGS. 17-19 corresponding to catalyst temperature of 355° C., 535° C., and 720° C., respectively. These experimentally-determined data points of the optimized NH₃/NO ratios are directly compared to modeled results according to the equation $y=ax^n$ as set forth above.

As depicted in FIGS. 17-19 for exhaust NO concentrations of 250, 500, and 1000 ppm, respectively, the model fits the experimental data well.

Example 10

Figure 20:
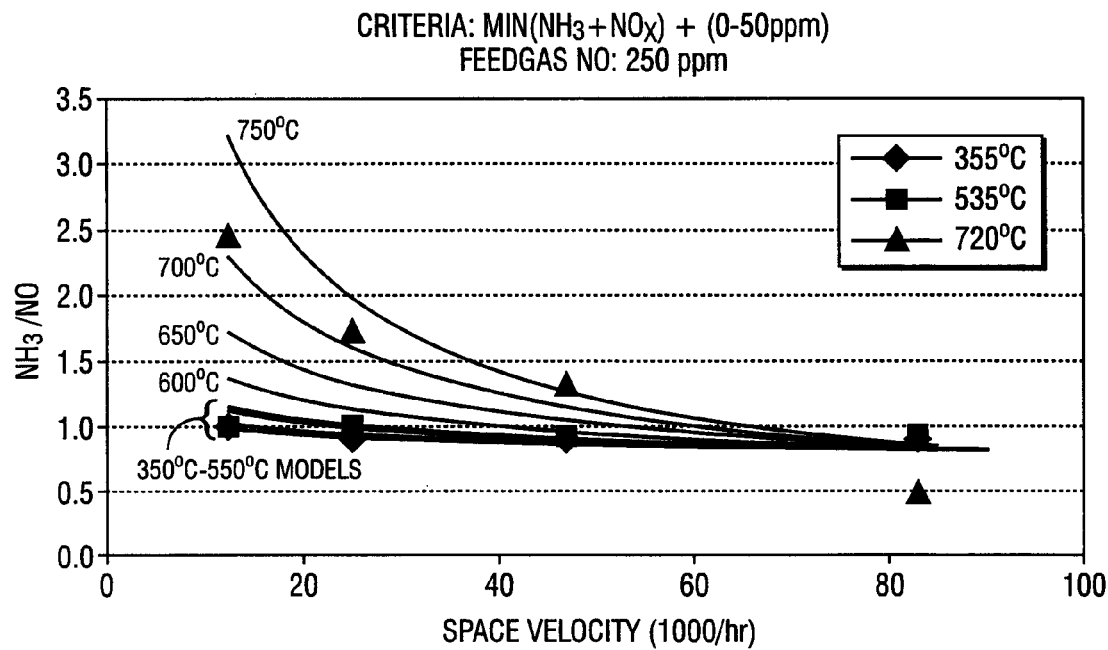
FIGS. 20, 21, and 22 depict the model predictions of equation $y=ax^n$ at temperatures ranging from 350° C. to 750° C. in increments of 50° C. for NO concentrations of 250, 500, and 1000 ppm, respectively; the experimental values of the optimized $NH_3/NO$ ratio are shown for comparison, where the sum of the $NO_x$ and $NH_3$ emissions is up to 50 ppm above the minimum sum emission.
Figure 21:
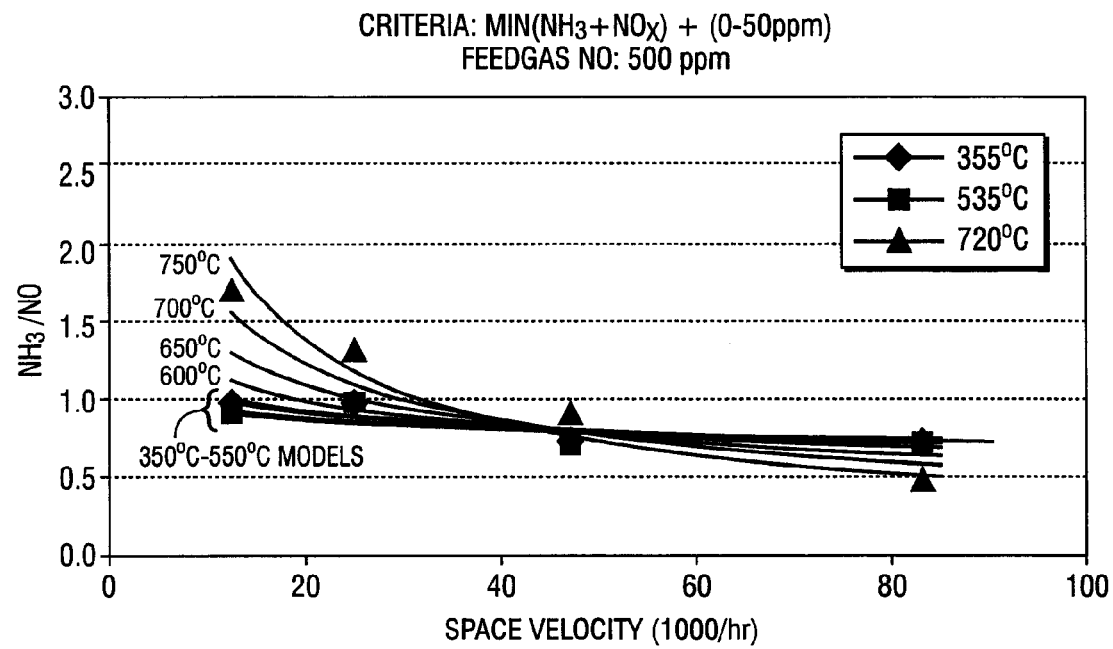
Figure 22:
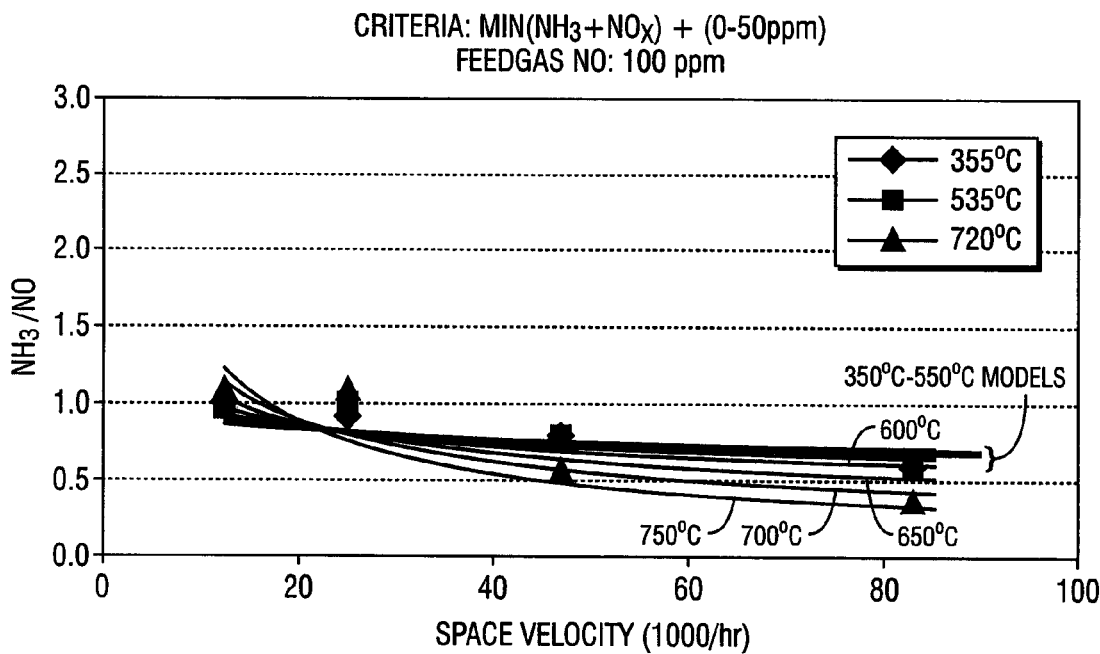

FIGS. 20, 21, and 22 display the model predictions of equation $y=ax^n$ at temperatures ranging from 350° C. to 750° C. in increments of 50° C. for NO concentrations of 250, 500, and 1000 ppm, respectively. The experimentally-determined ratios are also shown in the figures.

Example 11

An effort is made to show differences, if any, between the NH₃/$NO_x$ ratio as a function of the $NO_x$ flux under two separate emission control targets, namely to aim for the least amount of sum emissions of "$NO_x$+NH₃" (minimum emission condition) or to aim for a less stringent criteria where the allowable sum emission is allotted a permissive amount of 50 ppm (allotted emission condition).

The curve plotted under the condition corresponding to minimum $NO_x$+NH₃ is modeled into an equation given below:

$$[0.024(T/100)^2-0.22(T/100)+1.29]*[NOx*SV/10^7]^{[-0.057(T/100)^2+0.50(T/100)-1.30]}$$

wherein the temperature is in degrees Celcius.

Figure 23:
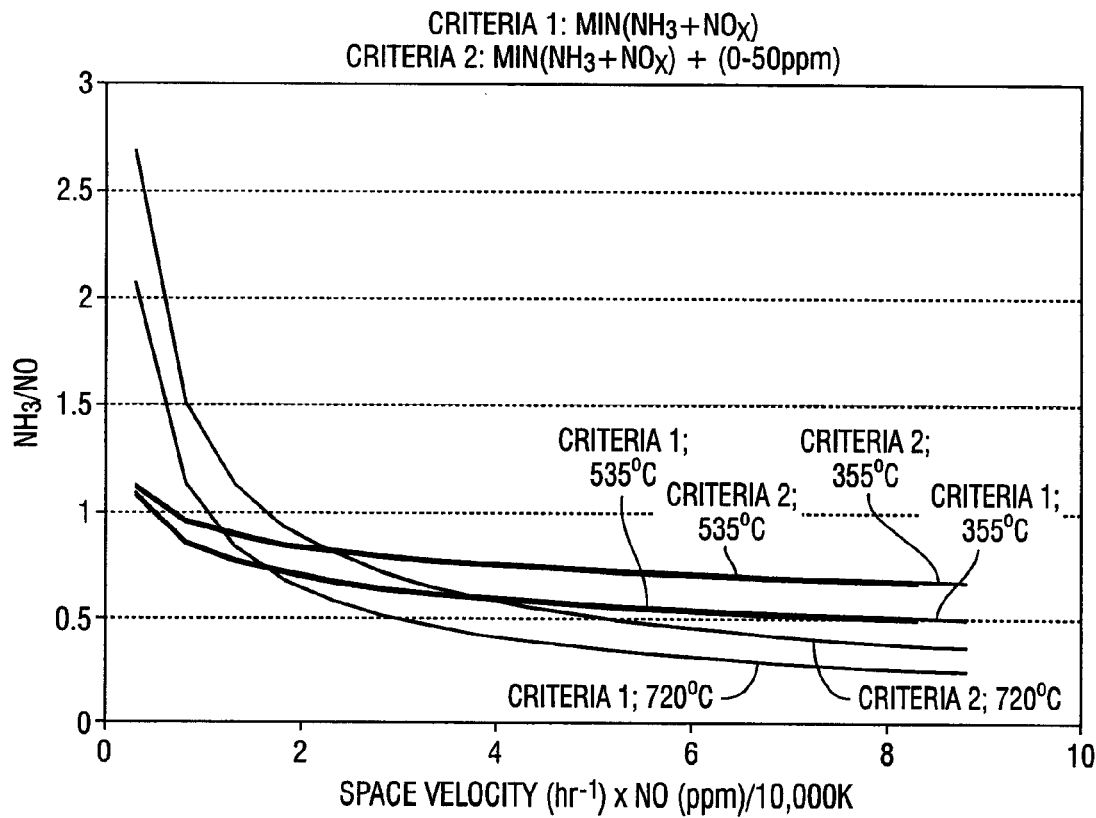
FIG. 23 depicts adjusted $NH_3/NO$ ratios plotted as a function of the single variable "X" (the product of the space velocity and the exhaust NO concentration) for all three temperatures of 350° C., 535° C., and 750° C., at respective conditions where the sum emission of "$NO_x+NH_3$" is kept at a minimum or where the sum emission of "$NO_x+NH_3$" is kept at a minimum plus an allotted amount of 50 ppm.

As can be seen from FIG. 23, the NH₃/$NO_x$ ratios generated under the minimum emission condition (criteria "1") are lower in value across the range of $NO_x$ flux tested when compared to those ratios generated under the allotted emission condition (criteria "2").

While the best mode for carrying out the invention has been described in detail, those familiar with the art to which this invention relates will recognize various alternative designs and embodiments for practicing the invention as defined by the following claims.

What is claimed:

1. An emission control system comprising:
 a reductant injector injecting a pre-determined amount of a reductant into a vehicle exhaust passage; and
 sensors measuring an exhaust space velocity, a selective catalytic reduction (SCR) catalyst temperature, and a before-SCR nitrogen oxide ($NO_x$) concentration;
 wherein the predetermined amount of the reductant is a function of the exhaust space velocity, the before-SCR $NO_x$ concentration, and the SCR catalyst temperature according to equation (I)

$$y=ax^n,$$

wherein y is the predetermined amount of the reductant;

x is the product of the exhaust space velocity and the before-SCR $NO_x$ concentration;

"a" and "n" are each independently a function of the SCR catalyst temperature;

the SCR catalyst temperature being measured in degrees Celsius; the before-SCR $NO_x$ concentration being measured in parts-per-million (ppm); and the exhaust space velocity being measured in inverse hours ($hr^{-1}$).

2. The emission control system of claim 1, further comprising a control module interfacing with the sensors, receiving vehicle operating parameters and controlling the predetermined amount of the reductant to be injected through the reductant injector.

3. The system of claim 2, wherein the sensors include:

a first sensor for receiving at least one of the vehicle operating parameters and measuring the before-SCR $NO_x$ concentration;

a second sensor for receiving at least one of the vehicle operating parameters and measuring the exhaust space velocity; and a third sensor for receiving at least one of the vehicle operating parameters and measuring the SCR catalyst temperature.

4. The system of claim 1, wherein "a" is determined by an equation (II)

$$a = p(T/100)^2 - q(T/100) + w$$

wherein "p", "q", and "w" are each independently a constant; and "T" is the SCR catalyst temperature.

5. The system of claim 4, wherein the constant "p" is in a range of 0.01 to 0.90.

6. The system of claim 4, wherein the constant "q" is in a range of 0.1 to 1.0.

7. The system of claim 4, wherein the constant "w" is in a range of 0.4 to 6.0.

8. The system of claim 1, wherein "n" is further determined by an equation (III)

$$n = -k(T/100)^2 + s(T/100) - u$$

wherein "k", "s", and "u" are each independently a constant; and "T" is the SCR catalyst temperature.

9. The system of claim 8, wherein the constant "k" is in a range of 0.005 to 0.95.

10. The system of claim 8, wherein the constant "s" is in a range of 0.1 to 2.0.

11. The system of claim 8, wherein the constant "w" is in a range of 0.4 to 2.4.

12. The system of claim 1, wherein the predetermined amount of the reductant is calculated according to an equation of $[0.060(T/100)^2 - 0.53(T/100) + 2.07]*[NO*SV/10^7]^{[-0.065(T/100)^2 + 0.58(T/100) - 1.39]}$, wherein NO stands for NO concentration, SV stands for the exhaust space velocity and T stands for the SCR catalyst temperature.

13. The system of claim 1, wherein the predetermined amount of the reductant is calculated by an equation of $[0.024(T/100)^2 - 0.22(T/100) + 1.29]*[NO*SV/10^7]^{[-0.057(T/100)^2 + 0.50(T/100) - 1.30]}$, wherein NO stands for NO concentration, SV stands for the exhaust space velocity and T stands for the SCR catalyst temperature.

14. An emission control system a reductant injector injecting a pre-determined amount of a reductant into a vehicle exhaust passage;

sensors measuring an exhaust space velocity, a selective catalytic reduction (SCR) catalyst temperature, and a before-SCR nitrogen oxide ($NO_x$) concentration;

wherein the predetermined amount of the reductant is calculated according to an equation (I) $y = ax^n$, wherein y is the predetermined amount of the reductant; x is the product of the exhaust space velocity and the before-SCR $NO_x$ concentration; "a" and "n" are each independently a function of the SCR catalyst temperature; wherein the SCR catalyst temperature is measured in degrees Celsius; the before-SCR $NO_x$ concentration is measured in parts-per-million (ppm); and the exhaust space velocity is measured in inverse hours ($hr^{-1}$);

a control module interfacing with the sensors to control injecting the predetermined amount of the reductant through the reductant injector;

wherein the sensors include a first sensor measuring the before-SCR $NO_x$ concentration, a second sensor measuring the exhaust space velocity and a third sensor measuring the SCR catalyst temperature.

15. A method for reducing nitrogen oxide ($NO_x$) of a vehicle exhaust passage having a selective catalytic reduction (SCR) catalyst disposed therein, the method comprising:

measuring an exhaust space velocity, a before-SCR $NO_x$ concentration, and a catalytic temperature of the SCR catalyst; and injecting a predetermined amount of a reductant to the vehicle exhaust passage;

wherein the predetermined amount of the reductant is a function of the exhaust space velocity, the before-SCR $NO_x$ concentration, and the SCR catalyst temperature according to equation (I)

$$y = ax^n,$$

wherein y is the predetermined amount of the reductant;

x is the product of the exhaust space velocity and the before-SCR $NO_x$ concentration;

"a" and "n" are each independently a function of the SCR catalyst temperature;

the SCR catalyst temperature being measured in degrees Celsius; the before-SCR $NO_x$ concentration being measured in parts-per-million (ppm); and the exhaust space velocity being measured in inverse hours ($hr^{-1}$).

16. The method of claim 15, wherein the "a" is further determined by an equation (II)

$$a = p(T/100)^2 - q(T/100) + w$$

wherein "p", "q", and "w" are each independently a constant; and "T" is the SCR catalyst temperature.

17. The method of claim 15, wherein "n" is further determined by an equation (III)

$$n = -k(T/100)^2 + s(T/100) - u$$

wherein "k", "s", and "u" are each independently a constant; and "T" is the SCR catalyst temperature.

18. The method of claim 15 further comprising injecting the predetermined amount of the reductant into the exhaust passage at a location downstream of an oxidative catalyst.

* * * * *